US000001429H

United States Statutory Invention Registration [19]

[11] Reg. Number: H1429

[43] Published: Apr. 4, 1995

Nishimura et al.

[54] SILVER HALIDE PHOTOGRAPHIC LIGHT-SENSITIVE MATERIAL

[75] Inventors: Motoi Nishimura; Hirokazu Sato; Katsumasa Yamazaki; Shigeto Hirabayashi, all of Hino, Japan

[73] Assignee: Konica Corporation, Japan

[21] Appl. No.: 901,089

[22] Filed: Jun. 19, 1992

[30] Foreign Application Priority Data

Jun. 28, 1991 [JP] Japan ..... 3-185114

[51] Int. Cl.[6] ..... G03C 1/08; G03C 7/26

[52] U.S. Cl. ..... 430/551; 430/552; 430/553; 430/556; 430/557

[58] Field of Search ..... 430/551, 552, 553, 556, 430/557

[56] References Cited

U.S. PATENT DOCUMENTS

| | | | |
|---|---|---|---|
| 4,540,658 | 9/1985 | Sasaki et al. | 430/551 |
| 4,629,682 | 12/1986 | Leppard et al. | 430/551 |
| 4,840,878 | 6/1989 | Hirose et al. | 430/551 |
| 4,923,783 | 5/1990 | Kobayashi et al. | 430/553 |
| 5,009,989 | 4/1991 | Aoki et al. | 430/551 |
| 5,059,515 | 10/1991 | Leppard | 430/551 |
| 5,084,375 | 1/1992 | Umemoto et al. | 430/551 |

FOREIGN PATENT DOCUMENTS

| | | | |
|---|---|---|---|
| 111448 | 6/1984 | European Pat. Off. | G03C 7/26 |
| 159912 | 10/1985 | European Pat. Off. | G03C 7/34 |
| 393718 | 10/1990 | European Pat. Off. | G03C 7/36 |

*Primary Examiner*—Shean Wu

*Attorney, Agent, or Firm*—Bierman and Muserlian

[57] ABSTRACT

The present invention offers a silver halide photographic light-sensitive material which is excellent in dye image storage stability, which undergoes little change in the photographic performance thereof between initiation and completion of continuous processing, which has excellent color reproducibility and sufficient color developability. The present invention comprises a silver halide photographic light-sensitive material having at least one silver halide emulsion layer containing a dye-forming coupler on the support, wherein said silver halide emulsion layer contains at least one compound having an ester group and an oxidation potential of not more than 1800 mV.

2 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE PHOTOGRAPHIC LIGHT-SENSITIVE MATERIAL

FIELD OF THE INVENTION

The present invention relates to a silver halide photographic light-sensitive material, more specifically a silver halide photographic light-sensitive material which is good in image storage stability and excellent in color developability and color reproducibility and which undergoes little change in the photographic performance thereof in continuous processing.

BACKGROUND OF THE INVENTION

In silver halide photographic light-sensitive materials undergoing direct viewing, such as color printing paper, it is a common practice to use a yellow coupler, a magenta coupler and a cyan coupler in combination as dye-forming couplers. These couplers are required to offer the desired level of basic performance, including the color reproducibility, color developability and image storage stability in the dye image obtained. In recent years, there has been increasing demand from users for improved dye image storage stability and improved color reproducibility leading to exact reproduction of the original color of the subject.

For improving image storage stability, the use of a phenol or piperidine derivative with a particular structure is proposed in Japanese Patent Examined Publication Nos. 1420/1976 and 6623/1977 and Japanese Patent Publication Open to Public Inspection (hereinafter referred to as Japanese Patent O.P.I. Publication) Nos. 87456/1984 and 96944/1991. However, these methods often result in reduction in coloring density.

Also, since the absorption characteristic of the obtained dye image is very important in color reproduction; couplers with good absorption characteristic have recently been studied actively. For example, the pivaloylacetanilide yellow couplers described in Japanese Patent O.P.I. Publication No. 123047/1988, 9051/1992 and Japanese Patent Application No. 245949/1990, which have an alkoxy group in the anilide moiety thereof, were found useful for color printing paper because they form a dye with sharp absorption. However, various investigations of these yellow couplers revealed a drawback of insufficient stability to light, i.e., light fastness, of the dye image formed.

Also, in color photographic light-sensitive materials and light-sensitive materials for printing, there recently has been increasing demand for high sensitivity and stable processing with the trend toward time reduction in the printing and developing processes. Particularly the photographic performance change with change in processing solution component concentration in continuous processing has posed an increasingly difficult problem in rapid processing.

SUMMARY OF THE INVENTION

It is an object of the present invention to provide a silver halide photographic light-sensitive material excellent in storage stability to heat and light. It is another object of the present invention to provide a silver halide photographic light-sensitive material excellent in color developability. It is still another object of the present invention to provide a silver halide photographic light-sensitive material undergoing little change in the photographic performance thereof in continuous processing. It is yet another object of the present invention to provide a silver halide photographic light-sensitive material excellent in color reproduction.

The objects of the present invention described above are accomplished by the following constituents:

(1) A silver halide photographic light-sensitive material having at least one silver halide emulsion layer containing a dye-forming coupler on the support, wherein said silver halide emulsion layer contains at least one compound having an ester group and an oxidation potential of not more than 1800 mV.

(2) A silver halide photographic light-sensitive material as described in (1) above, wherein said compound having an ester group and an oxidation potential of not more than 1800 mV is a compound represented by the following formula I:

Formula I

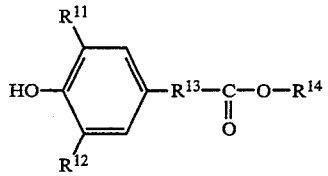

(wherein $R^{11}$ and $R^{12}$ independently represent an alkyl group; $R^{13}$ represents a divalent binding group; $R^{14}$represents a hydrogen atom or a substituent.)

(3) A silver halide photographic light-sensitive material as described in (1) above, wherein said compound having an ester group and an oxidation potential of not more than 1800 mV is a compound represented by the following formula II:

Formula II

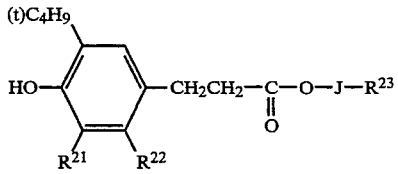

(wherein $R^{21}$ and $R^{22}$ independently represent a hydrogen atom or an alkyl group having 1 to 5 carbon atoms; J represents an alkylene group or a simple bond; $R^{23}$represents a heterocyclic residue.)

(4) A silver halide photographic light-sensitive material as described in (1), (2) or (3) above, wherein said dye-forming coupler is a yellow coupler.

(5) A silver halide photographic light-sensitive material as described in (1), (2), (3) or (4) above, wherein said dye-forming coupler is a yellow coupler represented by the following formula Y-I:

Formula Y-I

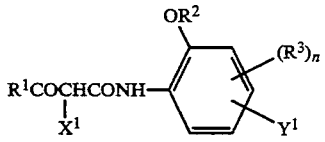

(wherein $R^1$ represents an alkyl group or a cycloalkyl group; $R^2$ represents an alkyl group, a cycloalkyl group, an aryl group or an acyl group; $R^3$ represents a group capable of substituting a benzene ring; n represents 0 or 1; $X^1$ represents a group capable of splitting off upon coupling with the oxidation product of a developing agent; $y^1$ represents an organic group.)

(6) A silver halide photographic light-sensitive material as described in (1), (2), (3), (4) or (5) above, wherein said dye-forming coupler is a cyan coupler.

(7) A silver halide photographic light-sensitive material having photographic structural layers including a blue-sensitive silver halide emulsion layer, a green-sensitive silver halide emulsion layer and a red-sensitive silver halide emulsion layer on the support, wherein at least one of said blue-sensitive silver halide emulsion layers contains at least one kind of the yellow coupler represented by formula Y-I, described in (5) above, and one kind of the compound represented by formula II, described in (3) above.

DETAILED DESCRIPTION OF THE INVENTION

First, the compound relating to the present invention (hereinafter referred to as the compound of the present invention), which has an ester group and an oxidation potential of not more than 1800 mV, is described below.

In the present invention, oxidation potential is defined to be obtained by cyclic voltammetry. Oxidation potential can be determined by taking a cyclic voltamogram at a sweeping speed of 50 mV/second in acetonitrile solvent at 20° C., using platinum for a working electrode, an indicator electrode and saturated calomel for a reference electrode and tetra-n-butyl-ammonium perchlorate as a supporting electrolyte.

For the present invention, a compound represented by the following formula I or II is desirable.

Formula I

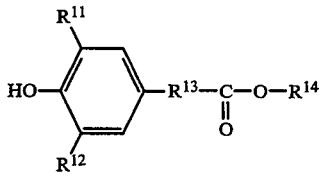

(wherein $R^{11}$ and $R^{12}$ independently represent an alkyl group; $R^{13}$ represents a divalent binding group; $R^{14}$ represents a hydrogen atom or a substituent.)

Formula II

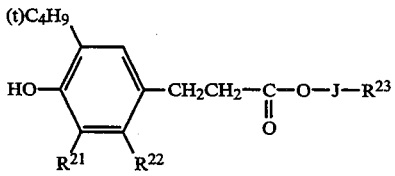

wherein $R^{21}$ and $R^{22}$ independently represent a hydrogen atom or an alkyl group having 1 to 5 carbon atoms; J represents an alkylene group or a simple bond; $R^{23}$represents a heterocyclic residue.

Next, the compounds represented by formulas I and II are described below.

In formula I, $R^{11}$ and $R^{12}$ independently represent an alkyl group. Examples of preferable alkyl groups for $R^{11}$and $R^{12}$ include linear or branched alkyl groups having 1 to 24 carbon atoms, such as a methyl group, an ethyl group, an isopropyl group, a t-butyl group, an octyl group, a 2-ethylhexyl group, a dodecyl group, a tetradecyl group, an eicosyl group and a benzyl group, with preference given to branched alkyl groups.

$R^{13}$ represents a divalent binding group. Examples of groups for $R^{13}$ include an alkylene group and a phenylene group, which groups may have a substituent. The group for $R^{13}$ is preferably a linear alkylene group. Also, the number of carbons contained in $R^{13}$ preferably ranges from 1 to 10, more preferably from 2 to 6.

$R^{14}$ represents a hydrogen atom or a substituent. Examples of preferable substituents represented by $R^{14}$include alkyl groups, cycloalkyl groups, alkenyl groups, aryl groups, alkylamino groups, alkylthio groups, arylthio groups, alkoxycarbonyl groups and acyloxycarbonyl groups. $R^{14}$ preferably has at least one branching point in the molecular structure thereof.

Examples of alkyl groups for $R^{21}$ and $R^{22}$ in formula II include a methyl group, an ethyl group, a propyl group, a butyl group and an amyl group, which alkyl groups may be branched. Examples of alkylene groups for J include alkylene groups having 1 to 20 carbon atoms, such as a methylene group, an ethylene group, a propylene group and a butylene group, which alkylene groups may be branched. Examples of heterocyclic residues for $R^{23}$ include 5- or 6-membered ring residues containing a heteto atom such as of oxygen, sulfur or nitrogen, e.g., a thienyl group, a furyl group, a pyrrolyl group, a pyrrolidinyl group, a piperidyl group, a piperazinyl group, a morpholino group, a thiacyclohexyl group, a dithiacyclohexyl group, an oxacyclohexyl group and a dioxacyclohexyl group, which heterocyclic residues may have been condensed with another heterocyclic ring or a hydrocarbon ring and may have formed a spiro compound.

Also, the oxidation potential of the compound of the present invention is preferably in the range from 800 to 1800 mV, more preferably from 1200 to 1500 mV.

Examples of the compound of the present invention are given below, which are not to be construed as limitative on the invention.

I-1

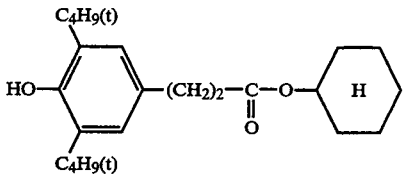

I-2

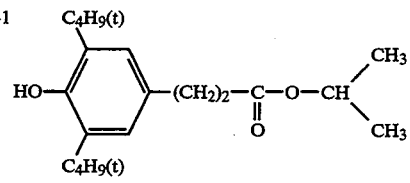

-continued
I-3
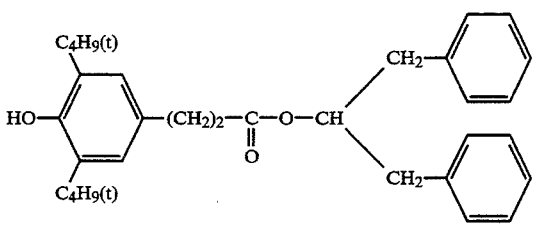
I-4
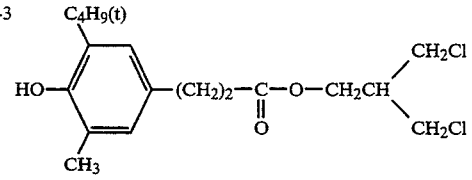
I-5
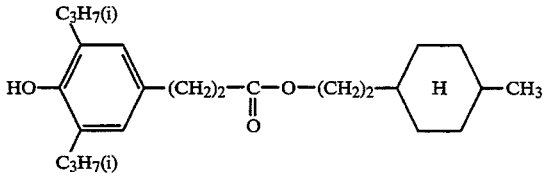
I-6
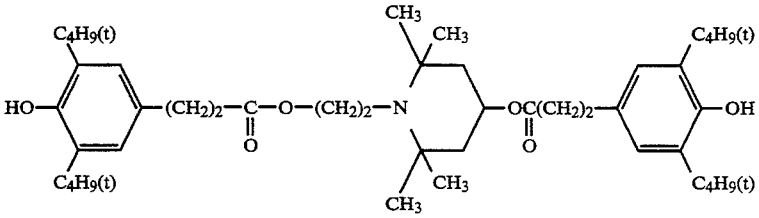
I-7
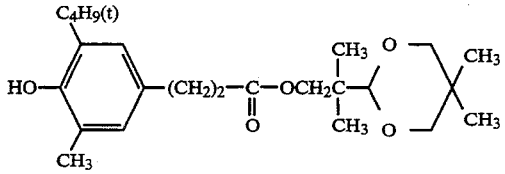
I-8
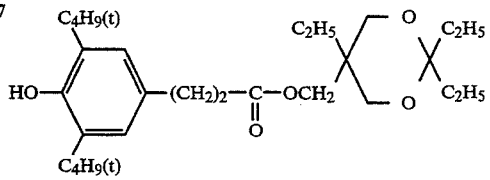
I-9
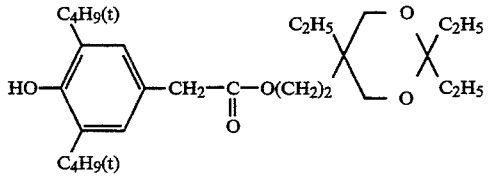
I-10
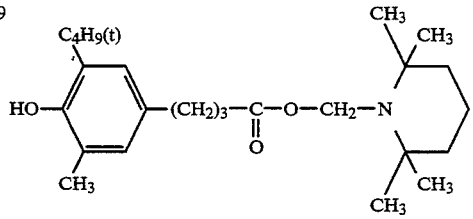
I-11
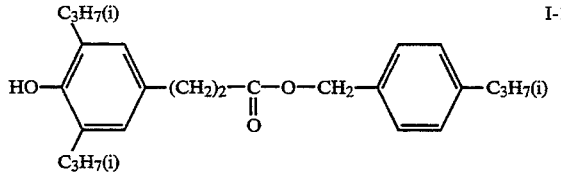
I-12
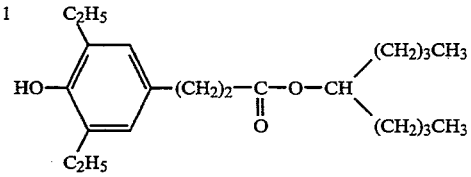
I-13
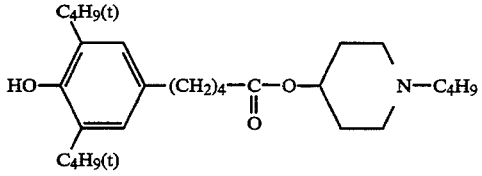
I-14
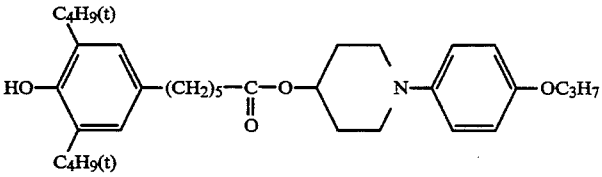

-continued
I-15
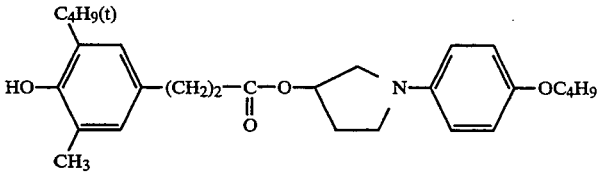
I-16
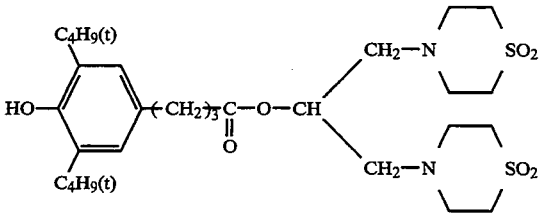
I-17
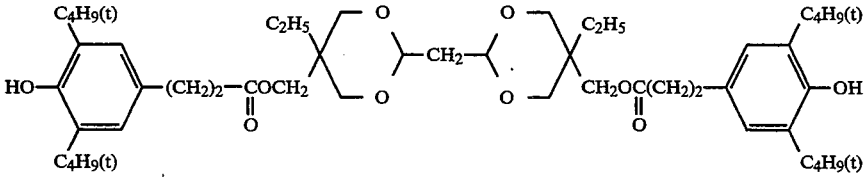
I-18
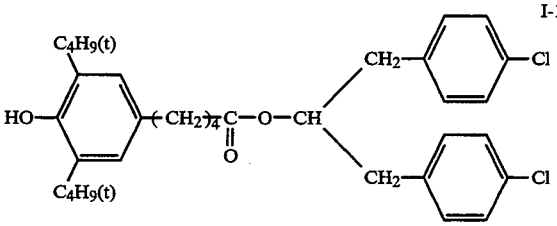
I-19
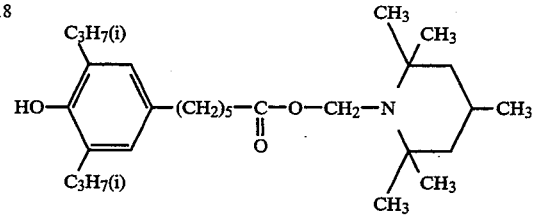
I-20
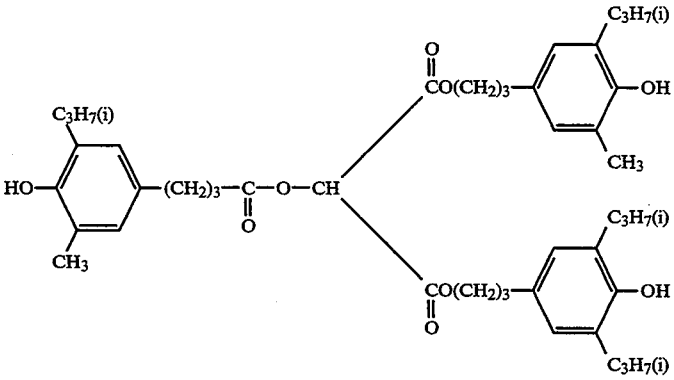
I-21
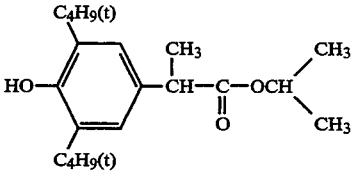
I-22
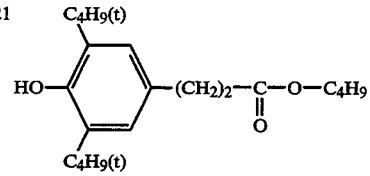
I-23
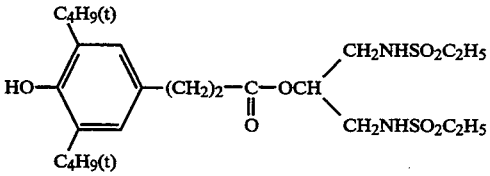
I-24
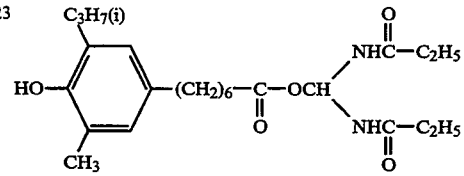

-continued
I-25
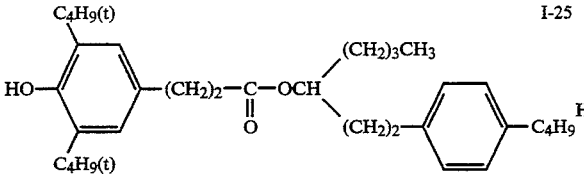
II-1
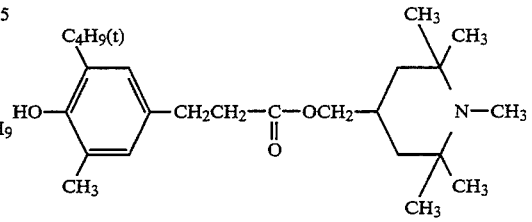
II-2
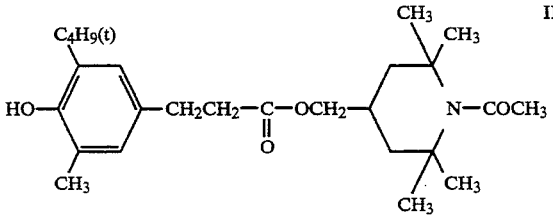
II-3
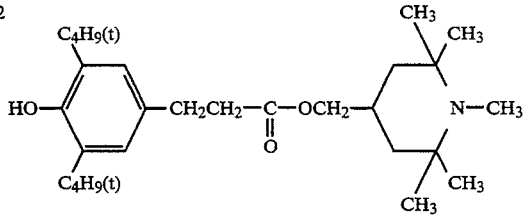
II-4
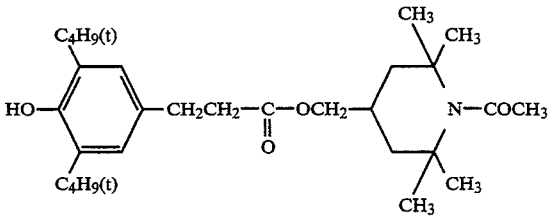
II-5
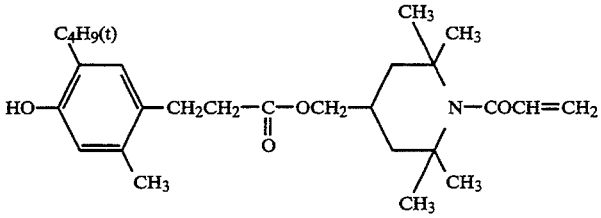
II-6
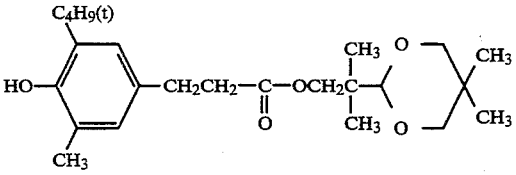
II-7
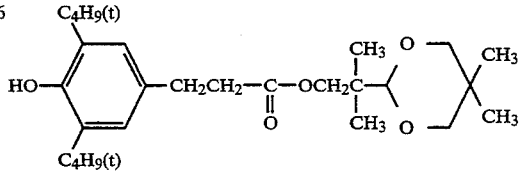
II-8
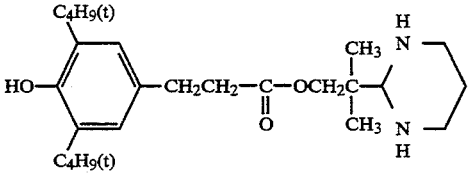
II-9
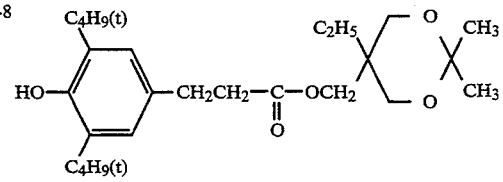
II-10
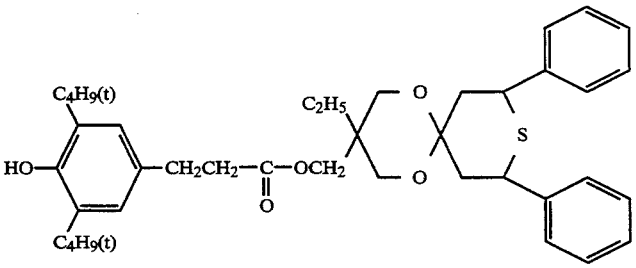

-continued

II-11

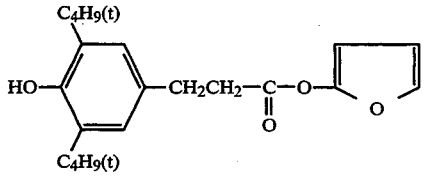

II-12

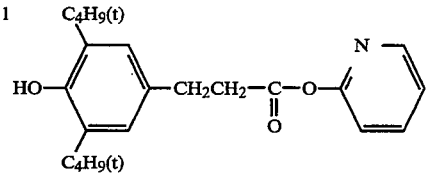

II-13

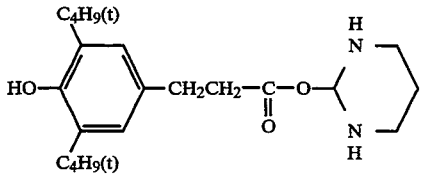

II-14

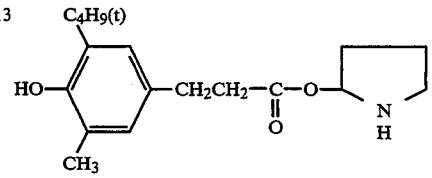

II-15

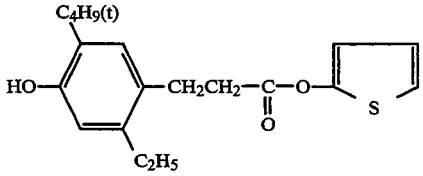

II-16

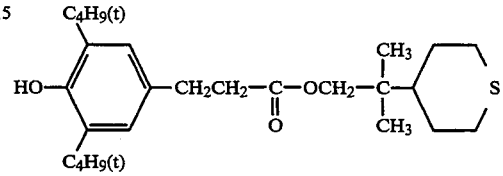

II-17

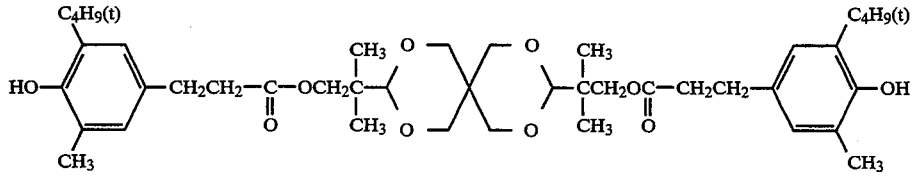

II-18

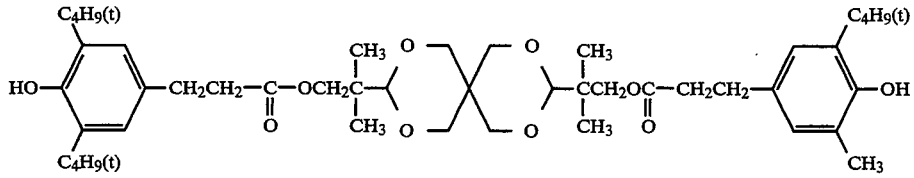

II-19

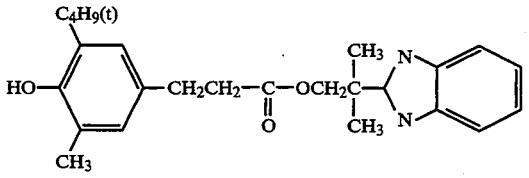

II-20

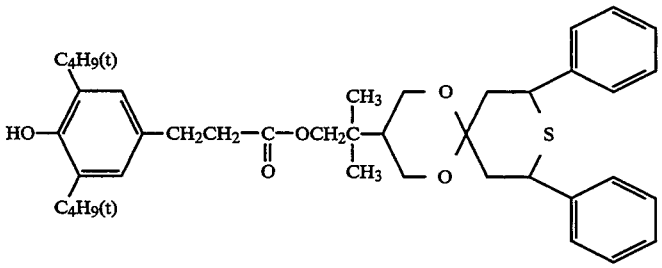

These compounds can easily be synthesized by the method described in European Patent No. 310,552.

These compounds may be used singly or in combination. The amount of their addition is preferably 5 to 300 mol %, more preferably 10 to 200 mol % relative to the amount of couplers.

Next, the yellow couplers used for the present invention are described below. Although any yellow coupler can be used without limitation in the present invention, a yellow coupler represented by formula Y-I is preferred.

Formula Y-I

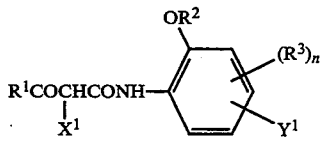

(wherein $R^1$ represents an alkyl group or a cycloalkyl group; $R^2$ represents an alkyl group, a cycloalkyl group, an aryl group or an acyl group; $R^3$ represents a group capable of substituting a benzene ring; n represents 0 or 1; $X^1$ represents a group capable of splitting off upon coupling with the oxidation product of a developing agent; $y^1$ represents an organic group.)

Examples of the alkyl group for $R^1$ in formula Y-I include a methyl group, an ethyl group, an isopropyl group, a t-butyl group and a dodecyl group. These alkyl groups for $R^1$ may have a substituent. Examples of the substituent include a halogen atom, an aryl group, an alkoxy group, an aryloxy group, an alkylsulfonyl group, an acylamino group and a hydroxyl group.

Examples of the cycloalkyl group for $R^1$ include a cyclopropyl group, a cyclohexyl group and an adamantyl group, with preference given to a branched alkyl group, more specifically a t-butyl group.

Examples of the alkyl group or cycloalkyl group for $R^2$ in formula Y-I include the groups specified for $R^1$. Examples of the aryl group for $R^2$ include a phenyl group. These alkyl groups, cycloalkyl groups and aryl groups for $R^2$ include those having the same substituent as specified for $R^1$. Examples of the acyl group for $R^2$ include an acetyl group, a propionyl group, a butyryl group, a hexanoyl group and a benzoyl group. The group for $R^2$ is preferably an alkyl group or an aryl group, more preferably an alkyl group, and still more preferably a lower alkyl group having not more than 5 carbon atoms.

Examples of the group capable of substituting a benzene ring, represented by $R^3$ in formula y-I, include halogen atoms such as a chlorine atom, alkyl groups such as an ethyl group, an isopropyl group and a t-butyl group, alkoxy groups such as a methoxy group, aryloxy groups such as a phenyloxy group, acyloxy groups such as a methylcarbonyloxy group and a benzoyloxy group, acylamino groups such as an acetamide group and a phenylcarbonylamino group, carbamoyl groups such as an N-methylcarbamoyl group and an N-phenylcarbamoyl group, alkylsulfonylamino groups such as an ethylsulfonylamino group, arylsulfonylamino groups such as a phenylsulfonylmaino group, sulfamoyl groups such as an N-propylsulfamoyl group and an N-phenylsulfamoyl group and imide groups such as a succinimide group and glutarimide group. n represents 0 or 1.

In formula Y-I, $y^1$ represents an organic group without limitation, but it is preferably a group represented by the following formula Y-II:

Formula Y—II—J—$R^4$ (wherein J represents —N ($R^5$) —CO—, —CON ($R^5$) —, —COO—, —N ($R^5$) —$SO_2$— or —$SO_2$—N ($R^5$) —; $R^4$ and $R^5$ independently represent a hydrogen atom, an alkyl group, an aryl group or a heterocyclic group.)

Examples of alkyl groups for $R^4$ and $R^5$ include a methyl group, an ethyl group, an isopropyl group, a t-butyl group and a dodecyl group. Examples of aryl groups for $R^4$ and $R^5$ include a phenyl group and a naphthyl group. These alkyl groups or aryl groups for $R^4$ and $R^5$ include those having a substituent. The substituent is not subject to limitation; typical examples thereof include halogen atoms such as a chlorine atom, alkyl groups such as an ethyl group and a t-butyl group, aryl groups such as a phenyl group, a p-methoxyphenyl group and a naphthyl group, alkoxy groups such as an ethoxy group and a benzyloxy group, aryloxy groups such as a phenoxy group, alkylthio groups such as an ethylthio group, arylthio groups such as a phenylthio group, alkylsulfonyl groups such as a β-hydroxyethylsulfonyl group and arylsulfonyl groups such as a phenylsulfonyl group. Examples also include acylamino groups such as an alkylcarbonylamino group, specifically an acetamide group, and arylcarbonylamino groups, specifically a phenylcarbonylamino group, carbamoyl groups, including those substituted by an alkyl group, an aryl group (preferably a phenyl group) or another substituent, such as an N-methylcarbamoyl group and an N-phenylcarbamoyl group, acyl groups such as an alkylcarbonyl group, specifically an acetyl group and an arylcarbonyl group, specifically a benzoyl group, sulfonamide groups such as an alkylsulfonylamino group and an arylsulfonylamino group, specifically a methylsulfonylamino group and a benzenesulfonamide group, sulfamoyl groups, including those substituted by an alkyl group, an aryl group (preferably a phenyl group) or another substituent, specifically an N-propylsulfamoyl group and an N-phenylsulfamoyl group, a hydroxy group and a nitrile group.

The preferable group represented by —J—$R^4$ is —NHCOR'$^4$ wherein R'$^4$ represents an organic group, preferably a linear or branched alkyl group having 1 to 30 carbon atoms, such as a methyl group, an ethyl group, a n-propyl group, an isopropyl group, a t-butyl group, a n-pentyl group, a n-hexyl group, a 2-ethylhexyl group, a n-octyl group, a n-decyl group, a linear or branched dodecyl group, a tridecyl group, a tetradecyl group, a pentadecyl group, a hexadecyl group, a heptadecyl group, an octadecyl group, a nonadecyl group, an eicosyl group, a docosyl group, a tetracosyl group and a hexacosyl group. Of these alkyl groups, those having 8 to 20 carbon atoms are particularly preferable.

In formula Y—I, $X^1$ represents a group splitting off upon coupling reaction with the oxidation product of a developing agent. Examples of such groups include the group represented by the following formula Y-III or Y-IV, with preference given to the group represented by formula Y-IV.

Formula Y-III—$OR^6$ (wherein $R^6$ represents an aryl group which may have a substituent or a heterocyclic group.)

Formula Y-IV

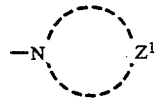

(wherein $Z^1$ represents a group of non-metallic atoms necessary to form a 5- or 6-membered ring in cooperation with the nitrogen atom. Examples of the group of non-metallic atoms necessary to form the 5- or 6-membered ring include a methylene group, a methine group, a substituted methine group, >C=O, >N$R^7$ ($R^7$ has the same definition as $R^5$ above), —N=, —O—, —S— and —$SO_2$—.)

The yellow coupler represented by formula Y-I may bind at the $R^1$, $R^3$ or $y^1$ moiety to form a bis configuration.

Next, examples of yellow couplers represented by formula Y-I are given below.

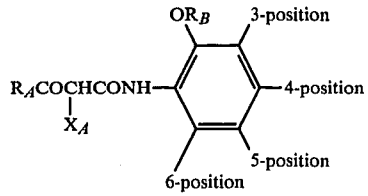
| No. | $R_A$ | $R_B$ | $X_A$ | 3-position | 4-position | 5-position | 6-position |
|---|---|---|---|---|---|---|---|
| Y-1 | (t)$C_4H_9$— | —$CH_3$ | 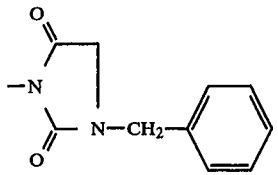 | —H | —H | 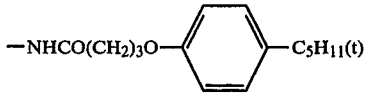 | —H |
| Y-2 | (t)$C_4H_9$— | —$CH_3$ | 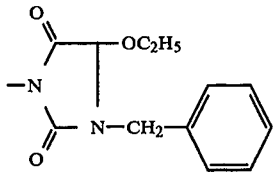 | —H | —H | 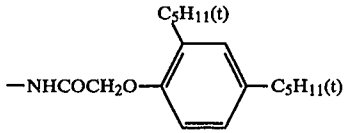 | —H |
| Y-3 | (t)$C_4H_9$— | —$CH_3$ | 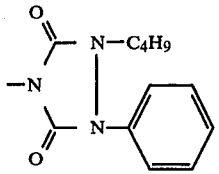 | —H | —H | 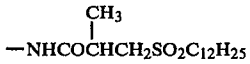 | —H |
| Y-4 | (t)$C_4H_9$— | —$CH_3$ | 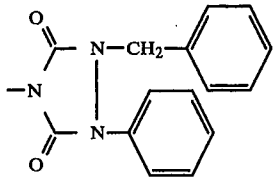 | —H | —H | 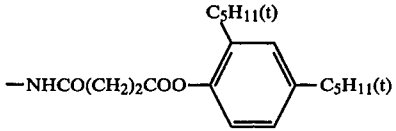 | —H |

-continued
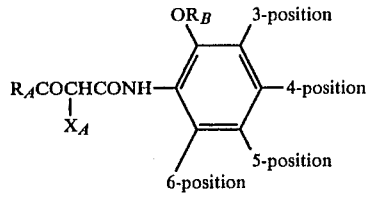
| No. | $R_A$ | $R_B$ | $X_A$ | 3-position | 4-position | 5-position | 6-position |
|---|---|---|---|---|---|---|---|
| Y-5 | (t)$C_4H_9$— | —$CH_3$ | 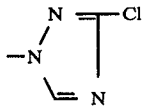 | —H | —H | —N—COCH$CH_2SO_2C_{18}H_{37}$ (CH$_3$; CH$_2$) 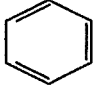 | —H |
| Y-6 | (t)$C_4H_9$— | —$CH_3$ | 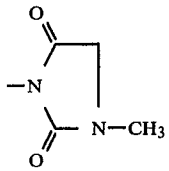 | —H | —H | —NHCOCH$CH_2SO_2C_{12}H_{25}$ ($CH_3$) | —H |
| Y-7 | (t)$C_4H_9$— | —$CH_3$ | 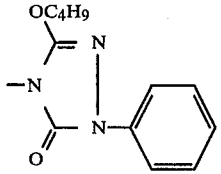 | —H | —H | —NHCO$(CH_2)_2$CON$C_{12}H_{25}$ ($C_2H_5$) | —H |
| Y-8 | (t)$C_4H_9$— | —$C_3H_7$(iso) | 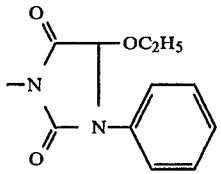 | —H | —H | —CONH$(CH_2)_3$CONH— 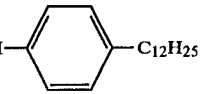 —$C_{12}H_{25}$ | —H |

-continued
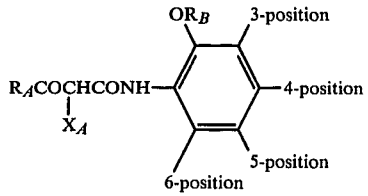
| No. | $R_A$ | $R_B$ | $X_A$ | 3-position | 4-position | 5-position | 6-position |
|---|---|---|---|---|---|---|---|
| Y-9 | (t)$C_4H_9$— | —$CH_3$ | 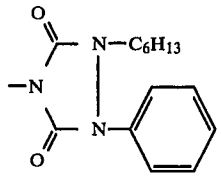 | —H | —H | 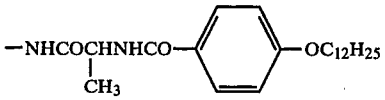 | —H |
| Y-10 | (t)$C_4H_9$— | —$CH_3$ | 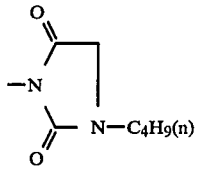 | —H | —H | —NHCOCH($CH_3$)$CH_2SO_2C_{12}H_{25}$ | —H |
| Y-11 | (t)$C_4H_9$— | —$CH_3$ | 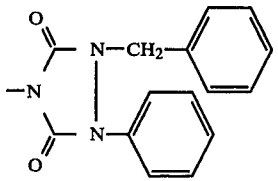 | —H | —H | —$CONH(CH_2)_2NHSO_2C_{12}H_{25}$ | —H |
| Y-12 | (t)$C_4H_9$— | —$CH_3$ | 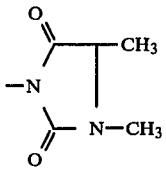 | —H | —H | —NHCOCH($CH_3$)$CH_2SO_2C_{12}H_{25}$ | —H |

-continued
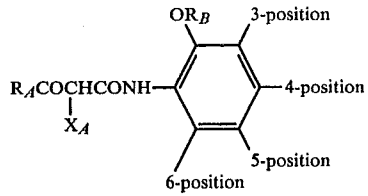
| No. | $R_A$ | $R_B$ | $X_A$ | 3-position | 4-position | 5-position | 6-position |
|---|---|---|---|---|---|---|---|
| Y-13 | (t)$C_4H_9$— | —$CH_3$ | 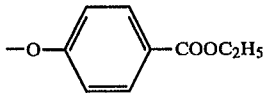 | —H | —H | 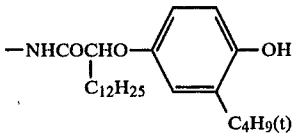 | —H |
| Y-14 | (t)$C_4H_9$— | —$C_{12}H_{25}$ | 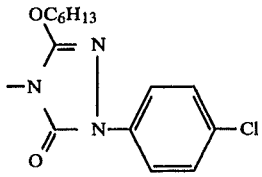 | —H | —H | —NHCO$(CH_2)_2SO_2$NHCH$_2$CH$C_4H_9$ ($C_2H_5$) | —H |
| Y-15 | (t)$C_4H_9$— | —$C_2H_5$ | 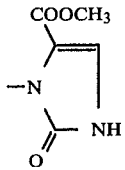 | —H | —H | 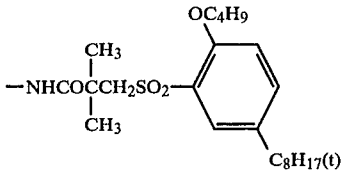 | —H |
| Y-16 | (t)$C_4H_9$— | —$CH_3$ | 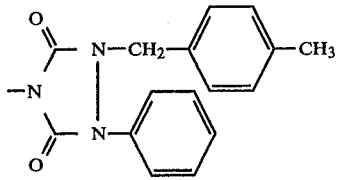 | —H | —H | —COO$C_{12}H_{25}$ | —H |

-continued
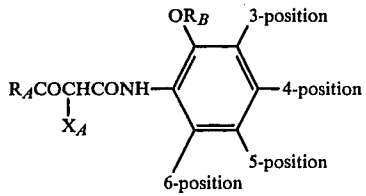
| No. | $R_A$ | $R_B$ | $X_A$ | 3-position | 4-position | 5-position | 6-position |
|---|---|---|---|---|---|---|---|
| Y-17 | 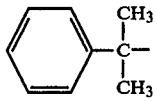 | $-C_{12}H_{25}$ | 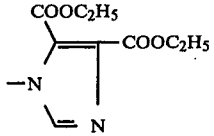 | —H | —H | $-NHCO(CH_2)_3NHCONHCH_2CH(C_2H_5)C_4H_9$ | —H |
| Y-18 | $(t)C_5H_{11}-$ | $-CH_3$ | 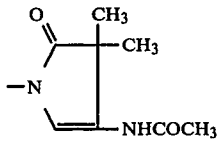 | —H | —H | 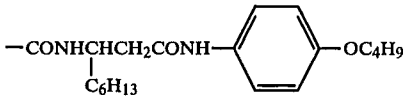 | —H |
| Y-19 | $(t)C_4H_9-$ | $-CH_3$ | 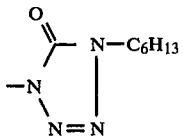 | —H | —H | $-NHCO(CH_2)_3NHCOCH_2CH(C_8H_{17})C_6H_{13}$ | —H |
| Y-20 | $(t)C_4H_9-$ | $-CH_3$ | 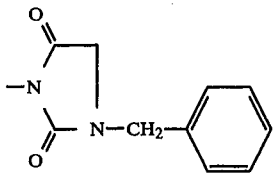 | —H | —H | $-NHCOC_{13}H_{27}(n)$ | —H |
| Y-21 | $(t)C_4H_9-$ | $-CH_3$ | 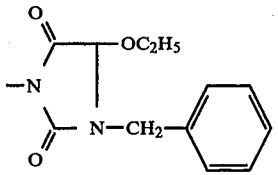 | —H | —H | $-CONHC_{14}H_{29}(n)$ | —H |

-continued
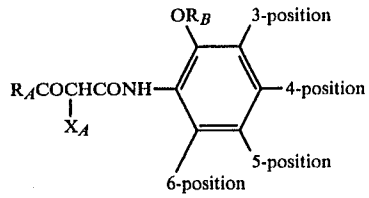
| No. | $R_A$ | $R_B$ | $X_A$ | 3-position | 4-position | 5-position | 6-position |
|---|---|---|---|---|---|---|---|
| Y-22 | (t)$C_4H_9$— | —$CH_3$ | 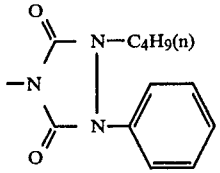 | —H | —H | —$NHCOC_{13}H_{27}$(n) | —H |
| Y-23 | (t)$C_4H_9$— | —$CH_3$ | 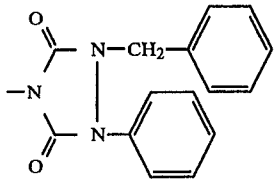 | —H | —H | —$NHCOC_{15}H_{31}$(n) | —H |
| Y-24 | (t)$C_4H_9$— | —$CH_3$ | 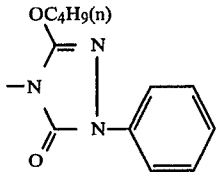 | —H | —H | —$NHCOC_{13}H_{27}$(n) | —H |
| Y-25 | (t)$C_4H_9$— | —$C_3H_7$(iso) | 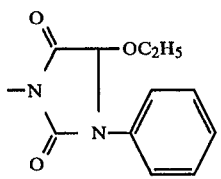 | —H | —H | —$CONHC_{14}H_{29}$(n) | —H |

-continued
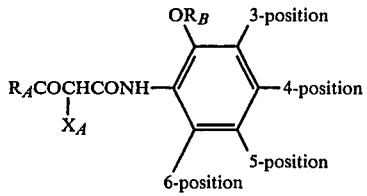
| No. | $R_A$ | $R_B$ | $X_A$ | 3-position | 4-position | 5-position | 6-position |
|---|---|---|---|---|---|---|---|
| Y-26 | (t)$C_4H_9$— | —$CH_3$ | 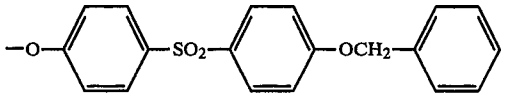 | —H | —H | —$CONHC_{14}H_{29}$(n) | —H |
| Y-27 | (t)$C_4H_9$— | —$C_{15}H_{37}$(n) | 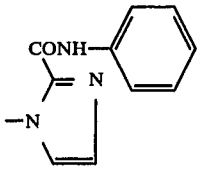 | —H | —H | —NHCO$CH(CH_3)CH_3$ | —H |
| Y-28 | (t)$C_4H_9$— | —$CH_3$ | 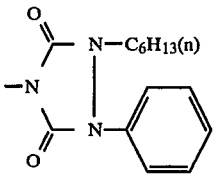 | —H | —H | —$NHCOC_9H_{19}$(n) | —H |
| Y-29 | (t)$C_4H_9$— | —$C_4H_9$ | 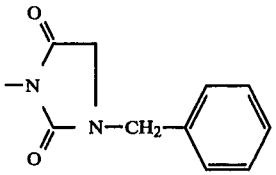 | —H | —H | —$NHCOC_{13}H_{27}$(n) | —H |

-continued
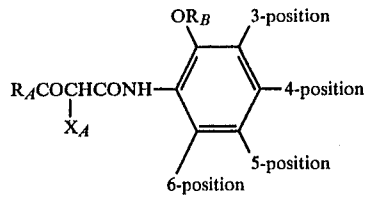
| No. | $R_A$ | $R_B$ | $X_A$ | 3-position | 4-position | 5-position | 6-position |
|---|---|---|---|---|---|---|---|
| Y-30 | (t)$C_4H_9$— | —$CH_3$ | 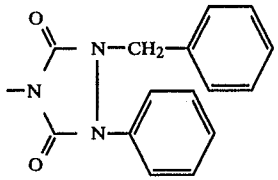 | —H | —H | —$CONHC_{14}H_{29}$(n) | —H |
| Y-31 | (t)$C_4H_9$— | —$C_{12}H_{25}$(n) | 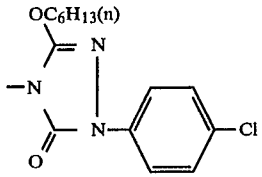 | —H | —H | —$NHCOC_{13}H_{27}$(n) | —H |
| Y-32 | (t)$C_4H_9$— | —$C_2H_5$ | 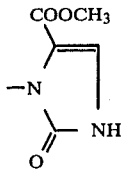 | —H | —H | —$NHCOC_{19}H_{39}$(n) | —H |
| Y-33 | (t)$C_4H_9$— | —$CH_3$ | 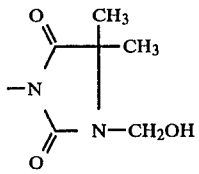 | —H | —H | —$CONHC_{16}H_{33}$(n) | —H |

-continued
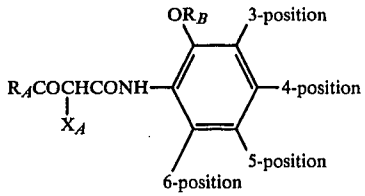
| No. | $R_A$ | $R_B$ | $X_A$ | 3-position | 4-position | 5-position | 6-position |
|---|---|---|---|---|---|---|---|
| Y-34 | (t)$C_4H_9$— | —$CH_3$ | 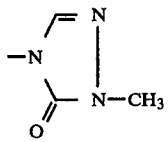 | —H | —H | —$CONHC_{14}H_{29}$(n) | —H |
| Y-35 | (t)$C_4H_9$— | —$CH_3$ | 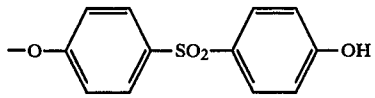 | —H | —Cl | —$NHCOC_{16}H_{31}$(i) | —H |
| Y-36 | (t)$C_4H_9$— | —$CH_3$ | 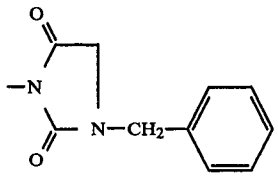 | —H | —H | —$NHCOC_{15}H_{31}$(n) | —H |
| Y-37 | (t)$C_4H_9$— | —$CH_3$ | 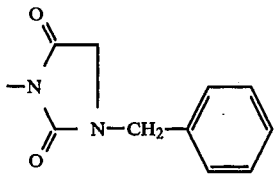 | —H | —H | —$NHCOC_{17}H_{36}$(n) | —H |
| Y-38 | (t)$C_4H_9$— | —$CH_3$ | 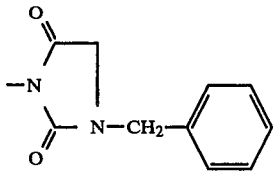 | —H | —H | —$NHCOCHC_{11}H_{28}$(n) $CH_3$ | —H |

-continued
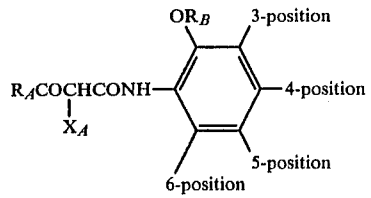
| No. | $R_A$ | $R_B$ | $X_A$ | 3-position | 4-position | 5-position | 6-position |
|---|---|---|---|---|---|---|---|
| Y-39 | (t)$C_4H_9$— | —$CH_3$ | 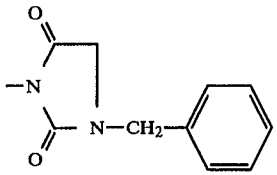 | —H | —H | —NHCOCH$_2$CH(C$_6$H$_{13}$(n))(C$_8$H$_{17}$(n)) | —H |
| Y-40 | (t)$C_4H_9$— | —$CH_3$ | 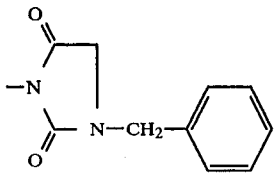 | —H | —H | —NHCOC(CH$_3$)$_2$C$_9$H$_{19}$(n) | —H |
| Y-41 | (t)$C_4H_9$— | —$CH_3$ | 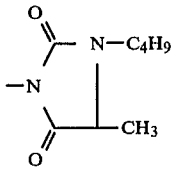 | —H | —H | —NHCOC$_{16}$H$_{31}$(i) | —H |
| Y-42 | (t)$C_4H_9$— | —$CH_3$ | 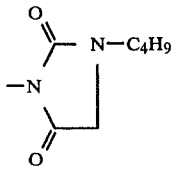 | —H | —H | —NHCOC$_{16}$H$_{31}$(i) | —H |

-continued
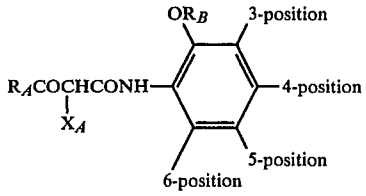
| No. | $R_A$ | $R_B$ | $X_A$ | 3-position | 4-position | 5-position | 6-position |
|---|---|---|---|---|---|---|---|
| Y-43 | (t)$C_4H_9$— | —$CH_3$ | 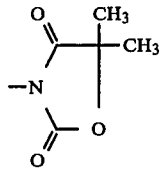 | —H | —H | 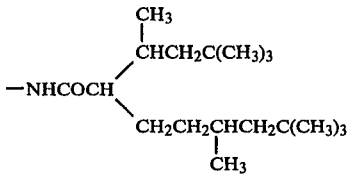 | —H |
| Y-44 | (t)$C_4H_9$— | —$CH_3$ | 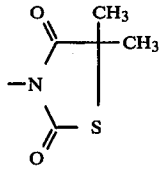 | —H | —H | —$NHSO_2C_{12}H_{25}$ | —H |
| Y-45 | (t)$C_4H_9$— | —$CH_3$ | 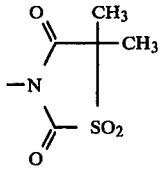 | —H | —Cl | —$COC_9H_{19}$ ‖ O | —H |
| Y-46 | (t)$C_4H_9$— | —$CH_3$ | 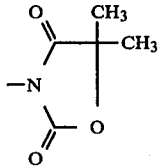 | —H | —H | —$COC_{14}H_{29}$ ‖ O | —H |

-continued
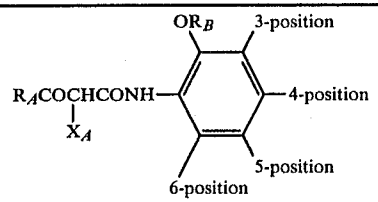
| No. | $R_A$ | $R_B$ | $X_A$ | 3-position | 4-position | 5-position | 6-position |
|---|---|---|---|---|---|---|---|
| Y-47 | (t)$C_4H_9$— | —$CH_3$ | 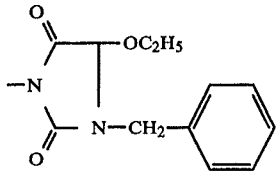 | —H | —H | —COC$_{12}$H$_{25}$ ‖ O | —H |
| Y-48 | (t)$C_4H_9$— | —$CH_3$ | 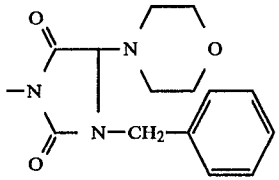 | —H | —H | —COC$_{14}$H$_{29}$ ‖ O | —H |
| Y-49 | (t)$C_4H_9$— | —$CH_3$ | 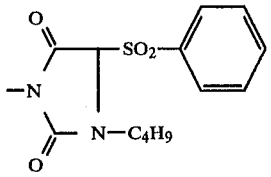 | —H | —H | 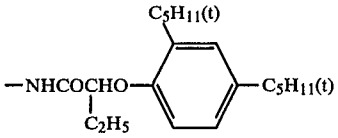 | —H |
| Y-50 | (t)$C_4H_9$— | —$CH_3$ | 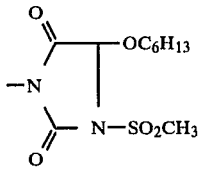 | —H | —H | —NHCOCHCH$_2$SO$_2$C$_{12}$H$_{25}$ \| $CH_3$ | —H |

These yellow couplers of the present invention, represented by formula Y-I, can easily be synthesized by the methods described in Japanese Patent O.P.I. Publication No. 123047/1988, Japanese Patent Application Nos. 245949/1990 and 96774/1990.

The yellow couplers represented by formula Y-I relating to the present invention may be used singly or in combination, and may be used in combination with other kinds of yellow couplers.

In the present invention, the yellow coupler can be used in the content ratio of about $1\times10^{-3}$ to about 1 mol, preferably $1\times10^{-2}$ mol to $8\times10^{-1}$ mol per mol of silver halide.

Next, the cyan couplers used for the present invention are described below. Although any cyan coupler may be used without limitation in the present invention, the cyan coupler for the present invention is preferably a naphthol cyan coupler, a phenol cyan coupler or an imidazole cyan coupler. More preferable cyan couplers are those represented by the following formulas C-I and C-II:

Formula C-I

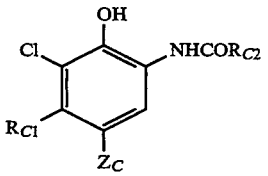

(wherein $R_{C1}$ represents an alkyl group having 2 to 6 carbon atoms; $RC_2$ represents a ballast group; $Z_C$ represents a hydrogen atom or a group capable of splitting off upon coupling with the oxidation product of a developing agent.)

Formula C-II

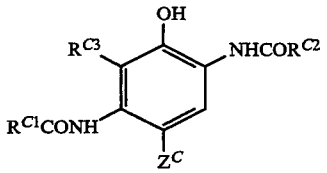

(wherein $R^{C1}$ represents an alkyl group or an aryl group; $R^{C2}$ represents an alkyl group, a cycloalkyl group, an aryl group or a heterocyclic group; $R^{C3}$ represents a hydrogen atom, a halogen atom, an alkyl group or an alkoxy group; $R^{C1}$ and $R^{C3}$ may cooperate to form a ring; $Z^C$ represents a hydrogen atom or an atom or group capable of splitting off upon coupling with the oxidation product of a developing agent.)

With respect to formula C-I, the alkyl group represented by $R_{C1}$, whether linear or branched, includes those having a substituent.

The ballast group represented by $R_{C2}$ is an organic group having a size and shape which provides the coupler molecule with sufficient bulkiness to make the coupler substantially incapable of diffusing from the layer to which it is applied to another layer. Said ballast group is preferably represented by the following formula:

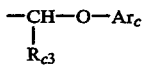

(wherein $R_{C3}$ represents an alkyl group having 1 to 12 carbon atoms; $Ar_C$ represents an aryl group such as a phenyl group, which aryl group includes those having a substituent.)

Examples of cyan couplers represented by formula C-I include example compounds PC-1 through PC-19 given in the upper right column, page 30, through upper left column, page 31, Japanese Patent O.P.I. Publication No. 156748/1989, example compounds C-1 through C-28 given in Japanese Patent O.P.I. Publication No. 249151/1987, the cyan couplers described in Japanese Patent Examined Publication No. 11572/1974 and Japanese Patent O.P.I. Publication No. 3142/1986, 9652/1986, 9653/1986, 39045/1986, 50136/1986, 99141/1986 and 105545/1986 and the cyan couplers described below, which are not to be construed as limitative.

With respect to formula C-II, the alkyl group represented by $R^{C1}$ preferably has 1 to 32 carbon atoms, which alkyl group may be linear or branched and includes those having a substituent.

The aryl group represented by $R^{C1}$ is preferably a phenyl group, including those having a substituent.

The alkyl group represented by $R^{C2}$ preferably has 1 to 32 carbon atoms, which alkyl group may be linear or branched and includes those having a substituent.

The cycloalkyl group represented by $R^{C2}$ preferably has 3 to 12 carbon atoms, which cycloalkyl group may be linear or branched and includes those having a substituent.

The aryl group represented by $R^{C2}$ is preferably a phenyl group, including those having a substituent.

The heterocyclic group represented by $R^{C2}$ preferably has 5 to 7 members, including those having a substituent, and may have been condensed.

$R^{C3}$ represents a hydrogen atom, a halogen atom, an alkyl group or an alkoxy group, which alkyl group and alkoxy group include those having a substituent, but $R^{C3}$ is preferably a hydrogen atom.

The ring formed by $R^{C1}$ and $R^{C3}$ in cooperation is preferably a 5- or 6-membered ring. Examples of such rings include the following:

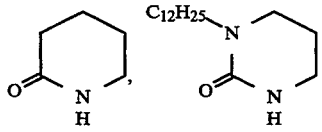

With respect to formula C-II, examples of the group capable of splitting off upon reaction with the oxidation product of a color developing agent, represented by $Z^C$, include halogen atoms, alkoxy groups, aryloxy groups, acyloxy groups, sulfonyloxy groups, acylamino groups, sulfonylamino groups, alkoxycarbonyloxy groups, aryloxycarbonyloxy groups and imide groups, with preference given to halogen atoms, aryloxy groups and alkoxy groups.

Of the cyan couplers represented by formula C-II, those represented by the following formula C-II-A are preferred.

Formula C-II-A

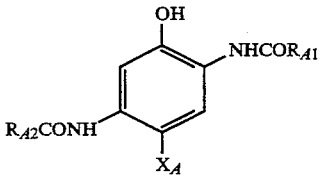

(wherein $R_{A1}$ represents a phenyl group substituted by at least one halogen atom; such phenyl groups include those having a non-halogen substituent. $R_{A2}$ has the same definition as $R^{C1}$ in formula C-II. $X_A$ represents a halogen atom, an aryloxy group or an alkoxy group, including those having a substituent.)

Examples of the cyan coupler represented by formula C-II include example compounds C-1 through C-25 given in Japanese Patent O.P.I. Publication No. 96656/1988, example compounds PC-II-1 through PC-II-31 given in lower left column, page 32, through upper left column, page 34, Japanese Patent O.P.I. Publication No. 156748/1989, the 2,5-diacylamino cyan couplers described in lower right column, page 7, through lower left column, page 9, Japanese Patent O.P.I. Publication No. 178962/1987, lower left column, page 7, through lower right column, page 10, Japanese Patent O.P.I. Publication No. 225155/1985, upper left column, page 6, through lower right column, page 8, Japanese Patent O.P.I. Publication No. 222853/1985 and lower left column, page 6, through upper left column, page 9, Japanese Patent O.P.I. Publication No. 185335/1984 and the cyan couplers described below, which can be synthesized in accordance with the methods described in these publications.

Examples of the cyan couplers represented by formulas C-I and C-II are given below.

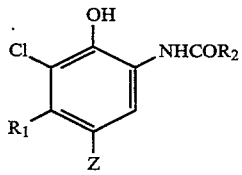

| Couplers | $R_1$ | Z | $R_2$ |
|---|---|---|---|
| C-1 | $-C_2H_5$ | $-Cl$ | 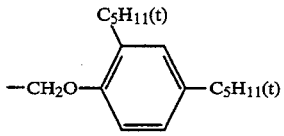 |
| C-2 | $-C_2H_5$ | 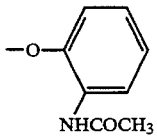 | 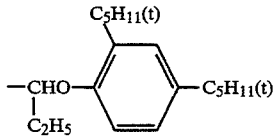 |
| C-3 | 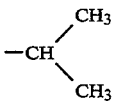 | $-Cl$ | 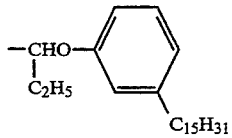 |
| C-4 | $-C_2H_5$ | $-Cl$ | 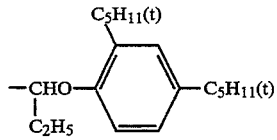 |
| C-5 | $-C_4H_9$ | $-F$ | 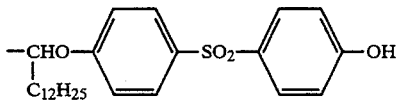 |
| C-6 | $-C_2H_5$ | $-F$ | 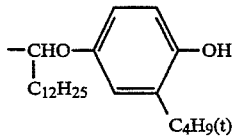 |

-continued
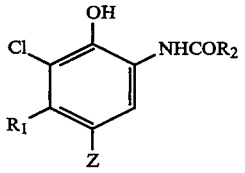
| Couplers | $R_1$ | Z | $R_2$ |
|---|---|---|---|
| C-7 | $-C_2H_5$ | $-Cl$ | 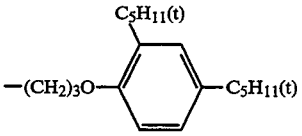 |
| C-8 | $-C_2H_5$ | $-Cl$ | 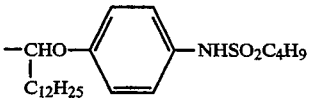 |
| C-9 | $-C_2H_5$ | $-Cl$ | 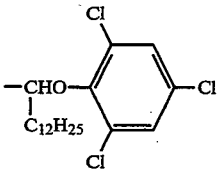 |
| C-10 | $-CH(CH_3)_2$ | $-Cl$ | $-C_{18}H_{37}$ |
| C-11 | $-C_6H_{13}$ | $-Cl$ | 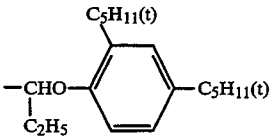 |
| C-12 | $-C_3H_7$ | $-Cl$ | 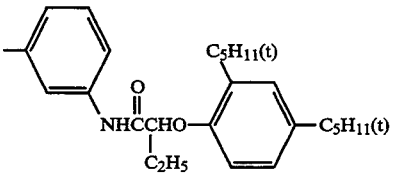 |
| C-13 | $-C_2H_4NHC(=O)CH_3$ | $-Cl$ | 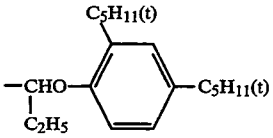 |
| C-14 | $-C_2H_4OCH_3$ | $-Cl$ | 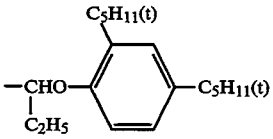 |
| C-15 | $-C_2H_5$ | $-Cl$ | 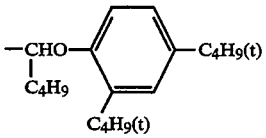 |
| C-16 | $-C_4H_9(t)$ | $-OCH_2CH_2SO_2CH_3$ | 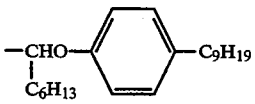 |

-continued
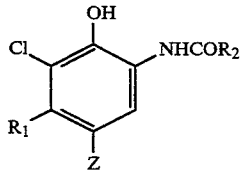
| Couplers | $R_1$ | Z | $R_2$ |
|---|---|---|---|
| C-17 | $-C_2H_5$ | $-Cl$ | 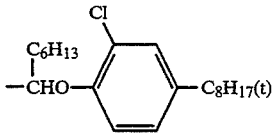 |
| C-18 | $-C_2H_5$ | $-Cl$ | 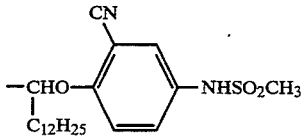 |
| C-19 | $-C_2H_5$ | $-Cl$ | 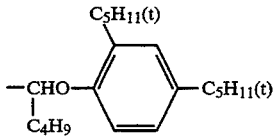 |
| C-20 | $-C_2H_5$ | $-Cl$ | $-C_{15}H_{31}(n)$ |

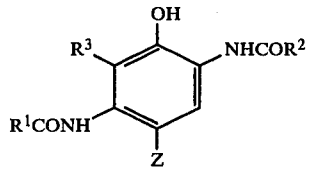
| Couplers | $R^2$ | $R^1$ | $R^3$ | Z |
|---|---|---|---|---|
| PC-1 | $-(CF_2)_4H$ | 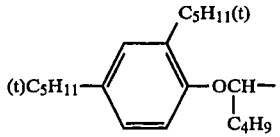 | H | —Cl |
| PC-2 | 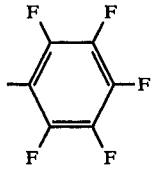 | 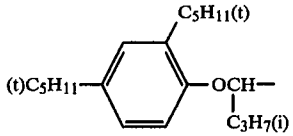 | H | —Cl |
| PC-3 | 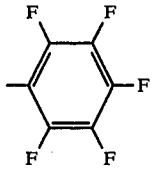 | 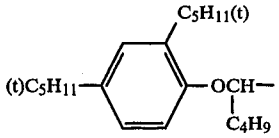 | H | —Cl |
| PC-4 | 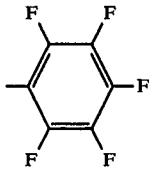 | $C_{16}H_{33}$— | —Cl | —Cl |
| PC-5 | 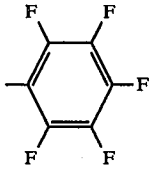 | 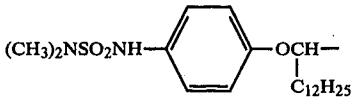 | H | 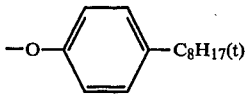 |

-continued
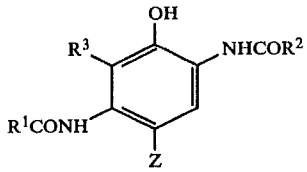
| Couplers | $R^2$ | $R^1$ | $R^3$ | Z |
|---|---|---|---|---|
| PC-6 | 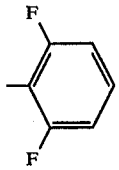 | 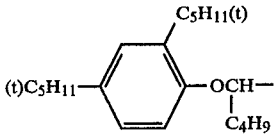 | H | H |
| PC-7 | 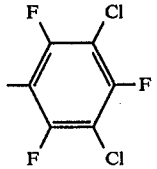 | 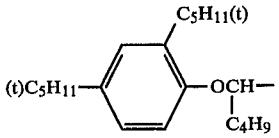 | H | —Cl |
| PC-8 | 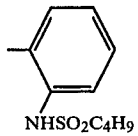 | 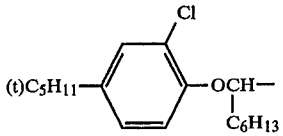 | H | —Cl |
| PC-9 | 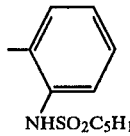 | 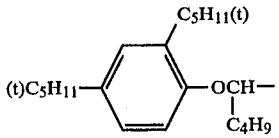 | H | 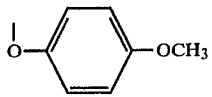 |
| PC-10 | 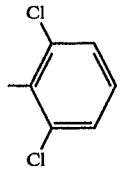 | 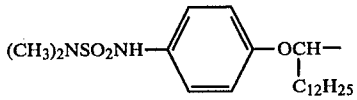 | H | —Cl |

-continued
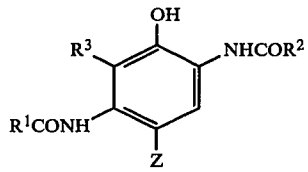
| Couplers | $R^2$ | $R^1$ | $R^3$ | Z |
|---|---|---|---|---|
| PC-11 | 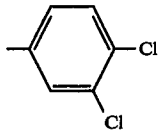 | 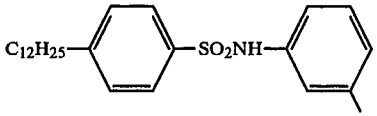 | H | —Cl |
| PC-12 | 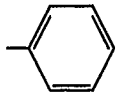 | 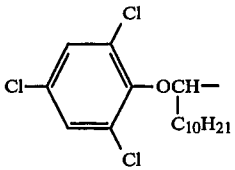 | H | —$OCH_2$—$CONHC_3H_7$ |
| PC-13 | 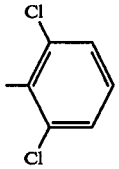 | 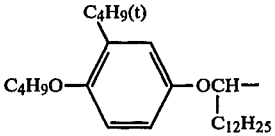 | H | —Cl |
| PC-14 | 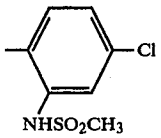 | 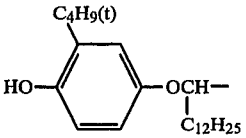 | H | —Cl |
| PC-15 | 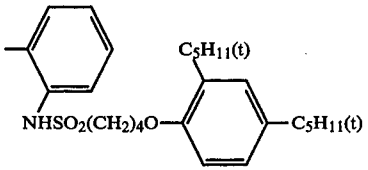 | 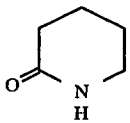 | | —Cl |

-continued
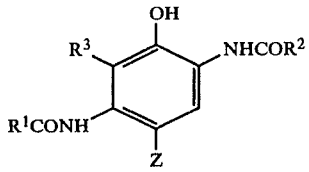
| Couplers | $R^2$ | $R^1$ | $R^3$ | Z |
|---|---|---|---|---|
| PC-16 | 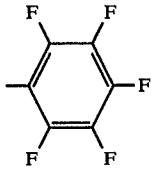 | 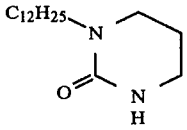 | | —Cl |
| PC-17 | 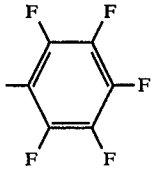 | 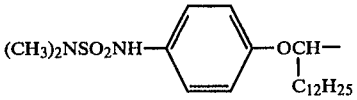 | H | —Cl |
| PC-18 | 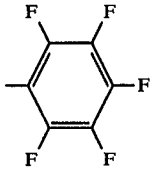 | 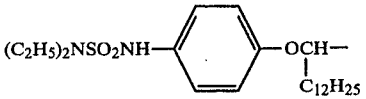 | H | —Cl |
| PC-19 | 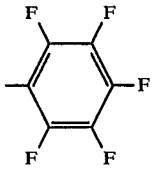 | 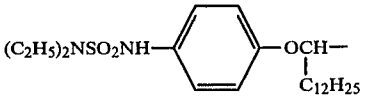 | H | 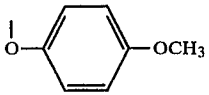 |

-continued
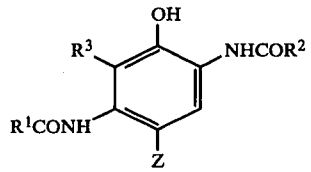
| Couplers | $R^2$ | $R^1$ | $R^3$ | Z |
|---|---|---|---|---|
| PC-20 | 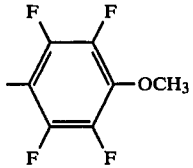 | 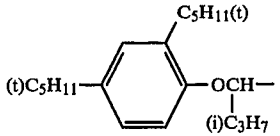 | H | —Cl |
| PC-21 | 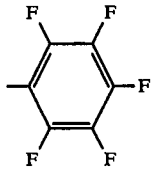 | 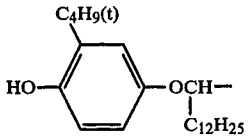 | H | —Cl |
| PC-22 | 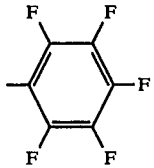 | 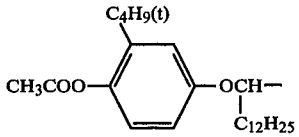 | H | —Cl |
| PC-23 | 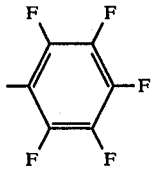 | 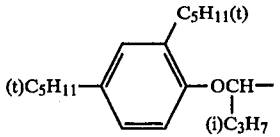 | H | 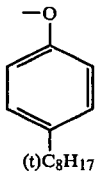 |
| PC-24 | 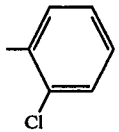 | 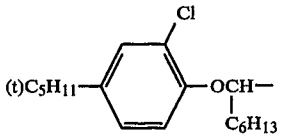 | H | —Cl |

-continued
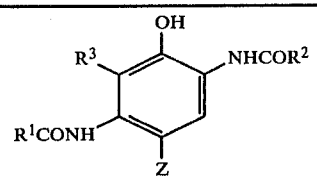
| Couplers | $R^2$ | $R^1$ | $R^3$ | Z |
|---|---|---|---|---|
| PC-25 | 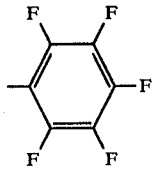 | 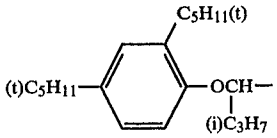 | H | $-OCH_2CO-NH(CH_2)_2-OCH_3$ |
| PC-26 | 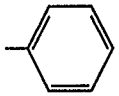 | 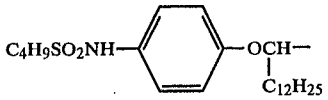 | H | $-Cl$ |
| PC-27 | $-C_3F_7$ | 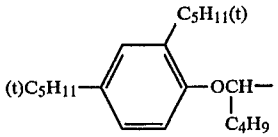 | H | H |
| PC-28 | $-C_3F_7$ | 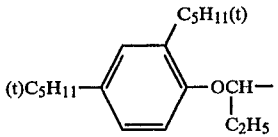 | H | H |
| PC-29 | 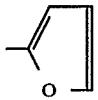 | 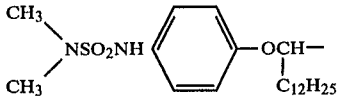 | H | $-Cl$ |
| PC-30 | 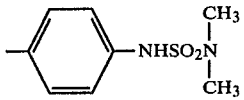 | 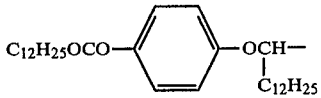 | $-OCH_3$ | $-Cl$ |

-continued
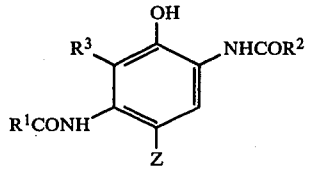
| Couplers | $R^2$ | $R^1$ | $R^3$ | Z |
|---|---|---|---|---|
| PC-31 | 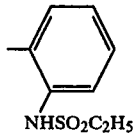 | 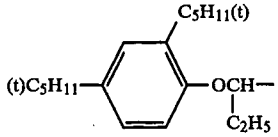 | H | —Cl |
| PC-32 | $-C_3F_7$ | 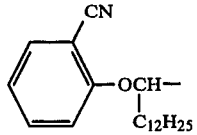 | H | H |
CA-1
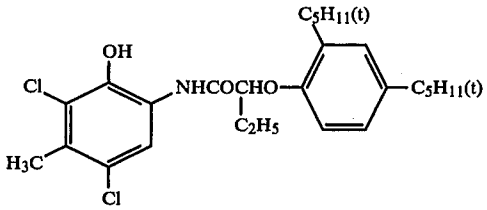
CA-2
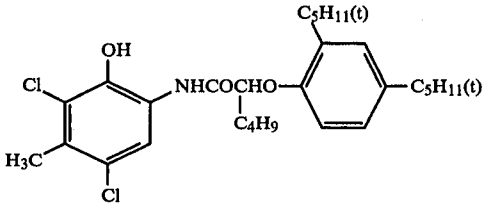

The cyan couplers can be used in the content range from $1\times10^{-3}$ to 1 mol, preferably from $1\times10^{-2}$ to $8\times10^{-1}$ mol per mol of silver halide.

These cyan couplers may be used in combination with other kinds of cyan coupler.

In the present invention, known couplers can be used as magenta couplers, including 5-pyrazolone couplers, pyrazolobenzimidazole couplers, pyrazolotriazole couplers and chain-opened acylacetonitrile couplers.

Preferably the compound of the present invention and couplers are used in the same layer, but the compound may be used in a layer adjacent to a coupler-containing layer.

The compound of the present invention and couplers and other hydrophobic compounds can be added to the light-sensitive material by various methods, including solid dispersion, latex dispersion and oil-in-water emulsion dispersion. For example, the compound of the present invention, couplers and other substances are dissolved in a high boiling organic solvent having a boiling point of over about 150° C. or in a water-insoluble organic-solvent-soluble high molecular compound in the presence of a low boiling and/or water-soluble organic solvent used as necessary, the resulting solution is emulsified and dispersed in a hydrophilic binder such as an aqueous solution of gelatin using a means of dispersion such as a mechanical stirrer, a homogenizer, a colloid mill, a flow jet mixer or an ultrasonicator in the presence of a surfactant, and the resulting emulsion is added to the target hydrophilic colloid layer. Another process may be added wherein the low boiling organic solvent is removed after or simultaneously with dispersion.

In the present invention, the high boiling organic solvent preferably has a dielectric constant of less than 6.0. Although the lower limit of dielectric constant is not subject to limitation, it is preferably not less than 1.9. Examples of such high boiling organic solvents include esters such as phthalates and phosphates, organic acid amides, ketones and hydrocarbon compounds, provided that they have a dielectric constant of less than 6.0. Also, in the present invention, high boiling organic solvents having a vapor pressure at 100° C. of not more than 0.5 mmHg are preferred.

The high boiling organic solvent may be a mixture of two or more kinds. In this case, the dielectric constant of the mixture is less than 6.0. Here, dielectric constant is as determined at 30° C.

Preferably, the high boiling organic solvent is a phthalate or phosphate.

The phthalate advantageously used for the present invention is represented by the following formula HA:

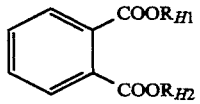

Formula HA wherein $R_{H1}$ and $R_{H2}$ independently represent an alkyl group, an alkenyl group or an aryl group, provided that the total number of carbon atoms in the groups represented by $R_{H1}$ and $R_{H2}$ is 9 to 32, more preferably 16 to 24.

The alkyl groups for $R_{H1}$ and $R_{H2}$ in formula HA may be linear or branched. Examples of aryl groups for $R_{H1}$ and $R_{H2}$ include a phenyl group and a naphthyl group; examples of alkenyl groups for $R_{H1}$ and $R_{H2}$ include a hexenyl group, a heptenyl group and an octadecenyl group. These alkyl groups, alkenyl groups and aryl groups may have a substituent.

The phosphate advantageously used for the present invention is represented by the following formula HB:

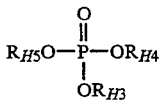

Formula HB wherein $R_{H3}$, $R_{H4}$ and $R_{H5}$ independently represent an alkyl group, an alkenyl group or an aryl group, provided that the total number of carbon atoms in the groups represented by $R_{H3}$, $R_{H4}$ and $R_{H5}$ is 24 to 54. These alkyl groups, alkenyl groups and aryl groups may have one or more substituents.

The preferable group for $R_{H3}$, $R_{H4}$ and $R_{H5}$ is an alkyl group, specifically a nonyl group, a n-decyl group, a sec-decyl group, a sec-dodecyl group and a t-octyl group.

Examples of the high boiling organic solvent described above include example organic solvents 1 through 22 given in page 41 of Japanese Patent O.P.I. Publication No. 166331/1987.

Examples of water-insoluble organic-solvent-soluble polymers used to disperse couplers etc. include the following:

(1) vinyl polymers and copolymers,
(2) condensation polymers of polyhydric alcohol and polybasic acid,
(3) polyesters obtained by ring-opening polymerization, and
(4) others, including polycarbonate resin, polyurethane resin and polyamide resin.

Although the number-average molecular weight of these polymers is not subject to limitation, it is preferably not more than 200,000, more preferably 5000 to 100,000. The ratio by weight of the polymer to the hydrophobic compounds is preferably 1:20 to 20:1, more preferably 1:10 to 10:1.

Examples of polymers which are preferably used for the present invention are given below. For copolymers, the ratio of monomer is given by weight.

PO-1: Poly(N-t-butyracrylamide)
PO-2: N-t-butyracrylamide-methyl methacrylate copolymer (60:40)
PO-3: Polybutyl methacrylate
PO-4: Methyl methacrylate-styrene copolymer (90:10)
PO-5: N-t-butyracrylamide-2-methoxyethyl acrylate copolymer (55:45)
PO-6: ω-methoxypolyethylene glycol acrylate (adduct molar number n=9)-N-t-butyracrylamide copolymer (25:75)
PO-7: 1,4-butanediol-adipic acid polyester
PO-8: Polypropiolactam The light-sensitive material of the present invention is applicable to color negative films, color positive films, color printing paper, etc., with the effect of the invention enhanced when the light-sensitive material is used for color printing paper undergoing direct viewing.

The silver halide for the present invention may be any silver halide, including silver chloride, silver bromide, silver iodide, silver chlorobromide, silver iodobromide and silver chloroiodide. The silver halide grains preferably used for the present invention have a silver chloride content of not less than 90 mol % a silver bromide content of not more than 10 mol % and a silver iodide content of not more than 0.5 mol %, with more preference given to a silver chlorobromide having a silver bromide content of 0.1 to 2 mol %. Said silver halide grains may be used singly or in combination with other kinds of silver halide grains with different composition, and may also be used in combination with silver halide grains having a silver chloride content of not more than 90 mol %. In the silver halide emulsion layers containing silver halide grains having a silver chloride content of not less than 90 mol %, the silver halide grains having a silver chloride content of not less than 90 mol % account for not less than 60% by weight, preferably not less than 80% by weight of the total silver halide grain content of said emulsion layers. The composition of the silver halide grains may be uniform from inside to outside, or may be different between inside and outside. In cases where there is a difference between inside and outside, the composition change may be continuous or not.

Although the grain size of silver halide grains is not subject to limitation, it is preferable in view of other photographic performance requirements such as rapid processing and sensitivity that the grain size be in the range from 0.2 to 1.6 μm, more preferably from 0.25 to 1.2 μm. The grain size can be determined by various methods in common use in the relevant field. Typical methods are described in "Particle-Size Measurement", ASTM Symposium on Light Microscopy, R. P. Loveland, pp. 94–122 (1955), or Chapter 2 of "The Theory of the Photographic Process", edited by Meath and James, 3rd edition, MacMillan (1966). The grain size can be determined on the basis of either the projected area of the grain or an approximated diameter.

When the grains have a substantially uniform shape, grain size distribution can be expressed with fair accuracy using the diameter or projected area. The grain size distribution of silver halide grains may be polydispersed or monodispersed. Preferred silver halide grains are monodispersed silver halide grains having a coefficient of variance of silver halide grain distribution of not more than 0.22, more preferably not more than 0.15. Here, the coefficient of variance is a coefficient indicating grain size distribution, as defined by the following equation:

$$\text{Coefficient of variance } (S/\bar{r}) = \frac{\text{grain size distribution standard deviation}}{\text{average grain size}}$$

$$\text{Grain size distribution standard deviation } (S) = \sqrt{\frac{\Sigma (r - \bar{r}i)^2 ni}{\Sigma ni}}$$

$$\text{Average grain size } (\bar{r}) = \frac{\Sigma niri}{\Sigma ni}$$

Here, ri represents the diameter of each grain; ni represents the number of grains. Grain size means the diameter of a grain, provided that the grain is a spherical silver halide grain, or the diameter of the circle with the same area converted from the projected area, provided that the grain is a cubic or otherwise nonspherical grain.

The silver halide grains used for the present invention may be prepared by any of the acidic method, the neutral method and the ammoniacal method. These grains may be grown at once or grown after seed grain formation. The method of preparing the seed grains and the method of growing them may be identical or not. As for the mode of reaction of a soluble silver salt and a soluble halide, any of the normal precipitation method, the reverse precipitation method, the double jet precipitation method and combinations thereof may be used, but the grains obtained by the simultaneous precipitation method are preferred. As a mode of the double jet precipitation method, the pAg controlled double jet method, which is described in Japanese Patent O.P.I. Publication No. 48521/1979, can also be used.

If necessary, a silver halide solvent such as thioether may be used. Also, a compound containing a mercapto group, a nitrogen-containing heterocyclic compound or a sensitizing dye compound may be added at the time of silver halide emulsion formation or after completion of said grains.

The shape of the silver halide grains for the present invention may be any one. A preferred shape is a cube having {100} planes to form the crystal surface. It is also possible to use octahedral, tetradecahedral, dodecahedral or other forms of grains prepared by the methods described in U.S. Pat. Nos. 4,183,756 and 4,225,666, Japanese Patent O.P.I. Publication No. 26589/1980, Japanese Patent Examined Publication No. 42737/1980 and the Journal of Photographic Science, 21, 39 (1973). Grains having twin crystal planes may also be used. The silver halide grains for the present invention may be of a single shape or a combination of various shapes.

The silver halide grains used for the present invention may be supplemented with metal ions using a cadmium salt, a zinc salt, a lead salt, a thallium salt, an iridium salt or a complex salt thereof, a rhodium salt or a complex salt thereof or an iron salt or a complex salt thereof to contain such metal elements in and/or on the grains during formation and/or growth of silver halide grains. Also, reduction sensitization specks can be provided in and/or on the grains by bringing the grains in an appropriate reducing atmosphere.

The emulsion containing silver halide grains may be treated to remove the undesirable soluble salts after completion of growth of silver halide grains or may retain said soluble salts. Removal of said salts can be achieved in accordance with the method described in Research Disclosure No. 17643.

The silver halide grains used in the emulsion for the present invention may be grains wherein latent images are formed mainly on the surface thereof or grains wherein latent images are formed mainly therein, with preference given to grains wherein latent images are formed mainly on the surface thereof.

In the present invention, the emulsion is chemically sensitized by a conventional method. Specifically, sulfur sensitization, which uses either a compound containing sulfur capable of reacting with silver ion or active gelatin, selenium sensitization, which uses a selenium compound, reduction sensitization, which uses a reducing substance, noble metal sensitization, which uses gold or another noble metal, and other sensitizing methods can be used singly or in combination.

The emulsion can also be optically sensitized in the desired wavelength band using a sensitizing dye. Sensitizing dyes which can be used for the present invention include cyanine dyes, merocyanine dyes, complex cyanine dyes, complex merocyanine dyes, holopolar cyanine dyes, hemicyanine dyes, styryl dyes and hemioxanol dyes.

It is the common practice to select dye-forming couplers for use in the silver halide photographic light-sensitive material of the present invention so that a dye absorbing the sensitization spectral light for each emulsion layer is formed; a yellow coupler, a magenta coupler and a cyan coupler are used in the blue-, green- and red-sensitive emulsion layers, respectively. However, the silver halide photographic light-sensitive material may be prepared using these couplers in different combinations according to the purpose.

Although it is advantageous to use gelatin as a binder (or protective colloid) for the silver halide photographic light-sensitive material of the present invention, it is possible to use gelatin derivatives, graft polymers of gelatin and another polymer and other hydrophilic colloids such as proteins, sugar derivatives, cellulose derivatives and synthetic hydrophilic polymer substances in the form of homo- or copolymer.

The silver halide photographic light-sensitive material of the present invention may optionally incorporate other additives such as hardeners, antistaining agents, image stabilizer, UV absorbents, plasticizers, latices, surfactants, matting agents, lubricants and antistatic agents.

The total amount of gelatin coated on the support of the silver halide photographic light-sensitive material of the present invention is preferably less than 7 g/m$^2$. Although the lower limit is not subject to limitation, the total amount is generally preferably not less than 3 g/m$^2$ from the viewpoint of physical properties or photographic performance. The amount of gelatin is determined as the weight of gelatin containing 11.0% water as determined by the PAGI method.

The gelatin contained in the silver halide photographic light-sensitive material of the present invention is hardened with a hardener. Any hardener can be used without limitation, including hardeners known in the photographic industry, such as aldehyde hardeners, active vinyl hardeners, active halogen hardeners, epoxy hardeners, ethyleneimine hardeners, methanesulfonate hardeners, carbodiimide hardeners, isoxazole hardeners and high molecular hardeners.

The effect of the present invention is enhanced when the silver halide photographic light-sensitive material of the invention is a light-sensitive material undergoing direct viewing, such as color printing paper or a light-sensitive material for color copying, which are open to strict requirements for image storage stability.

The light-sensitive material of the present invention permits image formation by a color developing process known in the relevant field.

The color developing agent used in the color developer is a primary amine based color developing agent in wide use in various color photographic processes, such as an aminophenol or p-phenylenediamine derivative.

In addition to the primary amine based color developing agent described above, known developer component compounds may be added to the color developer used to process the light-sensitive material of the present invention. The pH level of the color developer is normally not less than 9, preferably about 10 to 13. Color developing temperature is normally over 15° C., specifically in the range from 20° to 50° C. For rapid processing, it is preferable to carry out the color developing process at a temperature of over 30° C.

Although developing time is normally 10 seconds to 4 minutes, it is preferable to carry out development in the range from 10 to 30 seconds when rapid processing is desired. When more speed-up is required, it is preferable to carry out development in the range from 10 to 30 seconds.

When the light-sensitive material of the present invention is subjected to running processing while continuously supplying a color developer replenisher, the amount of color developer replenisher is preferably 20 to 150 ml, more preferably 20 to 120 ml, and more preferably 20 to 100 ml per m$^2$ of light-sensitive material. The effect of the present invention is enhanced when the running processing is carried out using such a low level of replenishment.

The light-sensitive material of the present invention is subjected to bleach-fixation after color development.

Bleach-fixation is normally followed by washing or stabilization or a combination thereof.

EXAMPLES

The present invention is hereinafter described in more detail by means of the following examples, which are not to be construed as limitative on the embodiment of the invention.

EXAMPLE 1

Preparation of Silver Halide Emulsion

The three kinds of silver halide emulsion listed in Table 1 were prepared by a combination of the neutral method and the double jet precipitation method.

TABLE 1

| Emulsion No. | AgCl (%) | AgBr (%) | Average grain size (μ) | Chemical sensitizers | Spectral sensitizing dye |
|---|---|---|---|---|---|
| Em-1 | 99.5 | 0.5 | 0.67 | Sodium thiosulfate*1 | SD-1*3 |
| Em-2 | 99.5 | 0.5 | 0.46 | Chloroauric acid*2 | SD-2*4 |
| Em-3 | 99.5 | 0.5 | 0.43 | | SD-3*5 |

*1: 2 mg added per mol of silver halide.
*2: $5 \times 10^{-5}$ mol added per mol of silver halide.
*3: 0.9 mmol added per mol of silver halide
*4: 0.7 mmol added per mol of silver halide.
*5: 0.2 mmol added per mol of silver halide.

Each silver halide emulsion was supplemented with the following emulsion stabilizer STB-1 in an amount of $5 \times 10^{-4}$ mol per mol of silver halide after completion of chemical sensitization.

Preparation of Silver Halide Color Photographic Light-Sensitive Material

Layers with the following compositions were coated on a paper support, laminated with polyethylene on one face and titanium oxide containing polyethylene on the first layer side of the other face, to yield multiple-layered photographic light-sensitive material No. 101. The coating solutions were prepared as follows.

First Layer Coating Solution 26.7 g of a yellow coupler Y-51, 0.67 g of an antistaining agent HQ-1 and 6.7 g of a high boiling organic solvent DNP were dissolved in 60 ml of ethyl acetate. This solution was emulsified and dispersed in 200 ml of a 10% aqueous solution of gelatin containing 10 ml of 10% sodium triisopropylnaphthalenesulfonate SU-1 using a homogenizer to yield a yellow coupler dispersion.

This dispersion was mixed with a blue-sensitive silver chlorobromide emulsion Em-1 (containing 8.71 g of silver) and a gelatin solution for coating to yield a first layer coating solution.

Second through seventh layer coating solutions were prepared in the same manner as with the first layer coating solution. The hardeners added were H-1 for layers 2 and 4 and H-2 for layer 7. Surfactants SU-2 and SU-3, as coating aids, were added to adjust surface tension.

TABLE 2

| Layer | Composition | Amount of addition (g/m$^2$) |
|---|---|---|
| Layer 7: Protective layer | Gelatin | 1.00 |
| Layer 6: Ultraviolet absorbing layer | Gelatin | 0.40 |
| | UV absorbent UV-1 | 0.10 |
| | UV absorbent UV-2 | 0.04 |
| | UV absorbent UV-3 | 0.16 |
| | Antistaining agent HQ-1 | 0.01 |
| | DNP | 0.20 |
| | PVP | 0.03 |
| Layer 5: Red-sensitive layer | Gelatin | 1.30 |
| | Red-sensitive silver chlorobromide emulsion Em-3 | 0.21 |
| | Cyan coupler C-4 | 0.24 |
| | Cyan coupler CC-2 | 0.08 |
| | Dye image stabilizer ST-1 | 0.20 |
| | Antistaining agent HQ-1 | 0.01 |
| | HBS-1 | 0.20 |
| | DOP | 0.20 |
| Layer 4: Ultraviolet absorbing layer | Gelatin | 0.94 |
| | UV absorbent UV-1 | 0.28 |
| | UV absorbent UV-2 | 0.09 |
| | UV absorbent UV-3 | 0.38 |
| | Antistaining agent HQ-1 | 0.03 |
| | DNP | 0.40 |
| Layer 3: Green-sensitive layer | Gelatin | 1.40 |
| | Green-sensitive silver chlorobromide emulsion Em-2 | 0.17 |
| | Magenta coupler M-1 | 0.35 |
| | Dye image stabilizer ST-2 | 0.20 |
| | Dye image stabilizer ST-3 | 0.20 |
| | DNP | 0.20 |
| Layer 2: Interlayer | Gelatin | 1.20 |
| | Antistaining agent HQ-2 | 0.12 |
| | DIDP | 0.15 |

TABLE 3

| | | |
|---|---|---|
| Layer 1: Blue-sensitive layer | Gelatin | 1.20 |
| | Blue-sensitive silver chlorobromide emulsion Em-1 | 0.26 |
| | Yellow coupler Y-51 | 0.80 |
| | Antistaining agent HQ-1 | 0.02 |
| | DNP | 0.20 |
| Support | Polyethylene-laminated paper | |

Figures for silver halide emulsions are expressed as silver.
DOP: Dioctyl phthalate DIDP: Diisodecyl phthalate
DNP: Dinonyl phthalate PVP: Polyvinylpyrrolidone Next, sample Nos. 102 through 132 were prepared in the same manner as above except that yellow coupler Y-51 for layer 1 was replaced as shown in Tables 4 and 5 and 0.1 mmol/m$^2$ of each of the dye image stabilizer shown in Tables 4 and 5 were added to layer 1.

The samples thus obtained were subjected to blue light exposure through an optical wedge using the sensitometer KS-7 (produced by Konica Corporation) and then processed in the following procedures.

| Processing procedures | Temperature | Time |
|---|---|---|
| Color development | 35.0 ± 0.3° C. | 45 seconds |
| Bleach-fixation | 35.0 ± 0.5° C. | 45 seconds |
| Stabilization | 30 to 34° C. | 90 seconds |
| Drying | 60 to 80° C. | 60 seconds |

| Color developer | |
|---|---|
| Water | 800 ml |
| Triethanolamine | 10 g |
| N,N-diethylhydroxylamine | 5 g |
| Potassium bromide | 0.02 g |
| Potassium chloride | 2 g |
| Potassium sulfite | 0.3 g |
| 1-hydroxyethylidene-1,1-diphosphonic acid | 1.0 g |
| Ethylenediaminetetraacetic acid | 1.0 g |
| Disodium catechol-3,5-diphosphonate | 1.0 g |
| N-ethyl-N-β-methanesulfonamidoethyl-3-methyl-4-aminoaniline sulfate | 4.5 g |
| Brightening agent (4,4'-diaminostylbenedisulfonic acid derivative) | 1.0 g |
| Potassium carbonate | 27 g |

Water was added to make a total quantity of 1 l, and the solution was adjusted to a pH of 10.10.

| Bleach-fixer | |
|---|---|
| Ferric ammonium ethylenediaminetetraacetate dihydrate | 60 g |
| Ethylenediaminetetraacetic acid | 3 g |
| Ammonium thiosulfate (70% aqueous solution) | 100 ml |
| Ammonium sulfite (40% aqueous solution) | 27.5 ml |

Water was added to make a total quantity of 1l, and potassium carbonate or glacial acetic acid was added to obtain a pH of 5.7.

| Stabilizer | |
|---|---|
| 5-chloro-2-methyl-4-isothiazolin-3-one | 1.0 g |
| Ethylene glycol | 1.0 g |
| 1-hydroxyethylidene-1,1-diphosphonic acid | 2.0 g |
| Ethylenediaminetetraacetic acid | 1.0 g |
| Ammonium hydroxide (20% aqueous solution) | 3.0 g |
| Ammonium sulfite | 3.0 g |
| Brightening agent (4,4'-diaminostylbenedisulfonic acid derivative) | 1.5 g |

Water was added to make a total quantity of 1l, and sulfuric acid or potassium hydroxide was added to obtain a pH of 7.0.

The samples thus processed were subjected to densitometry using a densitometer (PDA-65 model, produced by Konica Corporation) to determine their sensitivity. Sensitivity was obtained as the reciprocal of the exposure amount corresponding to a density of 0.5. Figures for sensitivity are expressed as percent ratio relative to the sensitivity of sample No. 101. Light fastness was also evaluated by determining the residual rate of density in a dye image with an initial density of 1.0 after 10 weeks of storage of each processed sample under direct sunlight (exposure table). Color reproducibility was evaluated by visual observation of the print samples. The results are shown in Tables 4 and 5.

TABLE 4

| Sample No | Dye image stabilizer | Oxidation potential | Yellow coupler | Color reproduction | Relative sensitivity | Residual rate (%) |
|---|---|---|---|---|---|---|
| 101 (comparative) | Not added | | Example coupler Y-51 | C | 100 | 60 |

TABLE 4-continued

| Sample No | Dye image stabilizer | Oxidation potential | Yellow coupler | Color reproduction | Relative sensitivity | Residual rate (%) |
|---|---|---|---|---|---|---|
| 102 (comparative) | Comparative compound YST-1 | 2060 | Example coupler Y-51 | C | 89 | 85 |
| 103 (comparative) | Comparative compound YST-2 | 1400 | Example coupler Y-51 | C | 102 | 70 |
| 104 (inventive) | Example compound I-1 | 1420 | Example coupler Y-51 | C | 97 | 80 |
| 105 (inventive) | Example compound I-6 | 1540 | Example coupler Y-51 | C | 102 | 83 |
| 106 (inventive) | Example compound I-8 | 1510 | Example coupler Y-51 | C | 102 | 81 |
| 107 (inventive) | Example compound I-17 | 1590 | Example coupler Y-51 | C | 92 | 82 |
| 108 (inventive) | Example compound I-21 | 1200 | Example coupler Y-51 | C | 97 | 83 |
| 109 (inventive) | Example compound I-22 | 1600 | Example coupler Y-51 | C | 92 | 84 |
| 110 (inventive) | Example compound I-25 | 1580 | Example coupler Y-51 | C | 102 | 83 |
| 111 (comparative) | Not added | | Example coupler Y-3 | B | 111 | 52 |
| 112 (comparative) | Comparative compound YST-1 | 2060 | Example coupler Y-3 | B | 68 | 82 |
| 113 (comparative) | Comparative compound YST-2 | 1400 | Example coupler Y-3 | B | 102 | 60 |
| 114 (inventive) | Example compound I-1 | 1420 | Example coupler Y-3 | A | 102 | 88 |
| 115 (inventive) | Example compound I-6 | 1540 | Example coupler Y-3 | A | 97 | 90 |
| 116 (inventive) | Example compound I-8 | 1510 | Example coupler Y-3 | B | 106 | 86 |
| 117 (inventive) | Example compound I-17 | 1590 | Example coupler Y-3 | A | 102 | 92 |
| 118 (inventive) | Example compound I-21 | 1200 | Example coupler Y-3 | B | 87 | 82 |
| 119 (inventive) | Example compound I-22 | 1600 | Example coupler Y-3 | B | 92 | 80 |
| 120 (inventive) | Example compound I-25 | 1580 | Example coupler Y-3 | B | 97 | 85 |
| 121 (comparative) | Comparative compound YST-1 | 2060 | Example coupler Y-20 | A | 73 | 89 |

Note: Color reproducibility increases in the order of A > B > C.

TABLE 5

| Sample No | Dye image stabilizer | Oxidation potential | Yellow coupler | Color reproduction | Relative sensitivity | Residual rate (%) |
|---|---|---|---|---|---|---|
| 122 (inventive) | Example compound I-1 | 1420 | Example coupler Y-20 | B | 106 | 91 |
| 123 (inventive) | Example compound I-6 | 1540 | Example coupler Y-20 | A | 102 | 90 |
| 124 (inventive) | Example compound I-8 | 1510 | Example coupler Y-20 | A | 106 | 88 |
| 125 (comparative) | Comparative compound YST-1 | 2060 | Example coupler Y-36 | A | 68 | 89 |
| 126 (inventive) | Example compound I-1 | 1420 | Example coupler Y-36 | B | 102 | 90 |
| 127 (inventive) | Example compound I-6 | 1540 | Example coupler Y-36 | A | 102 | 91 |
| 128 (inventive) | Example compound I-8 | 1510 | Example coupler Y-36 | A | 106 | 88 |
| 129 (comparative) | Comparative compound YST-1 | 2060 | Example coupler Y-46 | B | 73 | 90 |
| 130 (inventive) | Example compound I-1 | 1420 | Example coupler Y-46 | A | 106 | 89 |
| 131 (inventive) | Example compound I-6 | 1540 | Example coupler Y-46 | A | 106 | 89 |
| 132 (inventive) | Example compound I-8 | 1510 | Example coupler Y-46 | A | 102 | 90 |

Note: Color reproducibility increases in the order of A > B > C.

From Tables 4 and 5, it is evident that the samples incorporating comparative compound YST-1 as a dye image stabilizer, which has an ester group in the molecular structure thereof and an oxidation potential of 2060 mV (sample Nos. 102, 112, 121, 125 and 129), had reduced sensitivity, though the light fastness improved. Also, sample Nos. 103 and 113, which incorporated comparative compound YST-2 as a dye image stabilizer, which had no ester group in the molecular structure thereof, though the oxidation potential was 1400 mV, falling in the range of the present invention, had no sufficient light fastness, though the sensitivity did not decrease. On the other hand, the use of a compound relating to the present invention offered sufficient sensitivity and excellent light fastness.
SD-1
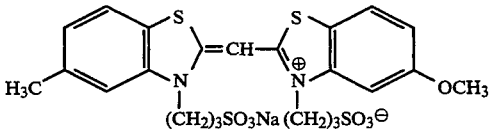
SD-2
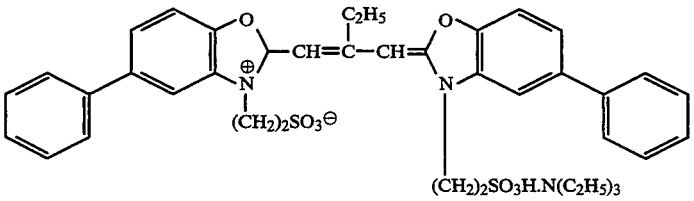
SD-3
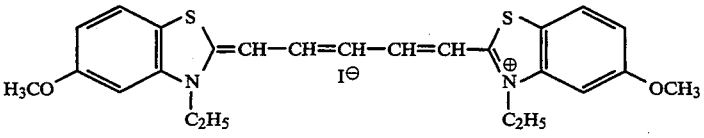
STB-1
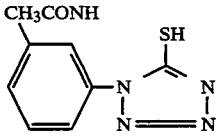
Y-51
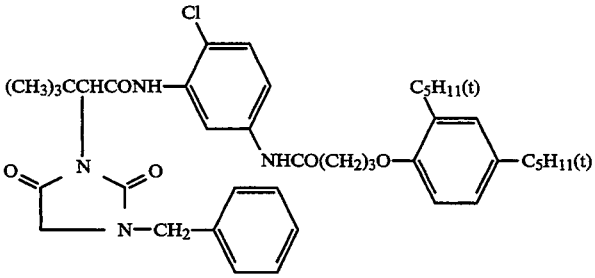
M-1
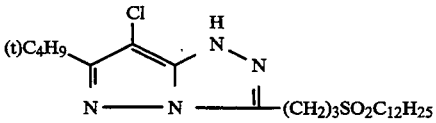
CC-2
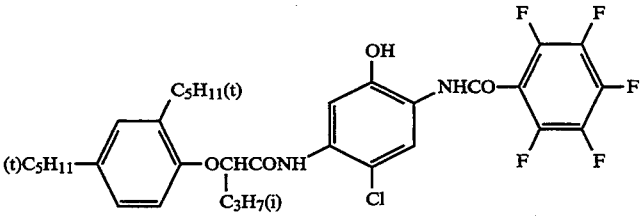
ST-1 ST-2

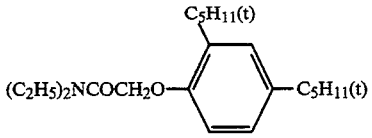

ST-3

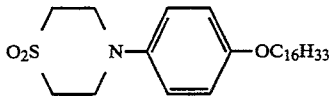

UV-2

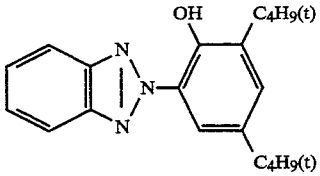

HQ-1

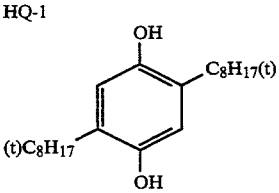

HBS-1

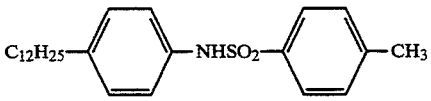

SU-2

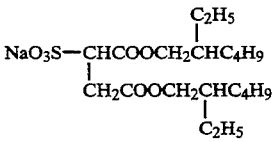

H-1

$C(CH_2SO_2CH{=}CH_2)_4$

Comparative compound YST-1

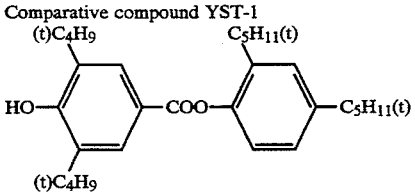

-continued

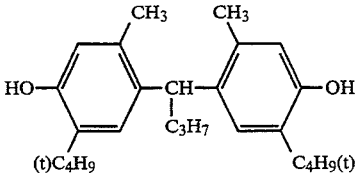

UV-1

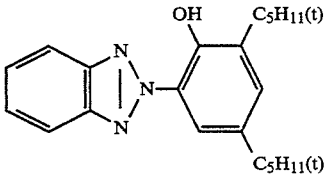

UV-3

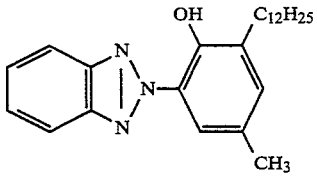

HQ-2

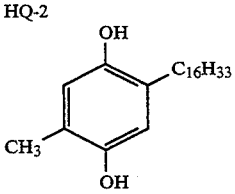

SU-1

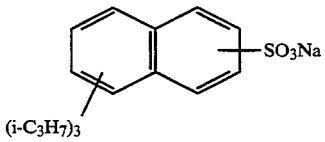

SU-3

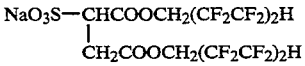

H-2

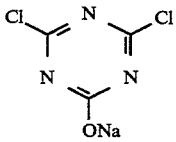

Comparative compound YST-2

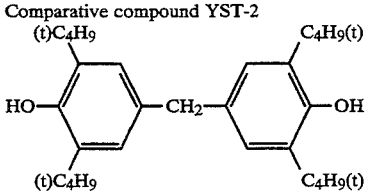

EXAMPLE 2

Sample Nos. 101 through 132, prepared in Example 1, were each subjected to exposure through an optical wedge and then continuously processed using a paper processor in the following procedures until the amount of replenisher became 2 times the capacity of the color developer tank. The finished samples thus obtained are referred to as sample Nos. 201 through 232.

| | Temperature | Time | Amount of replenisher | Tank capacity |
|---|---|---|---|---|
| Color development | 34.7 ± 0.3° C. | 45 seconds | 160 ml/m$^2$ | 16 l |
| Bleach-fixation | 34.7 ± 0.5° C. | 45 seconds | 215 ml/m$^2$ | 16 l |
| Stabilization 1 | 30 to 34° C. | 30 seconds | | 10 l |
| Stabilization 2 | 30 to 34° C. | 30 seconds | | 10 l |
| Stabilization 3 | 30 to 34° C. | 30 seconds | 245 ml/m$^2$ | 10 l |
| Drying | 60 to 80° C. | 60 seconds | | |

Stabilization was conducted while supplying the replenisher in the direction from stabilization step 3 to 1 by the counter-current method. The processing solutions used in the respective processes had the following compositions.

| Color developer | Tank solution | Replenisher |
|---|---|---|
| Pure water | 800 ml | 800 ml |
| Triethanolamine | 8 g | 10 g |
| N,N-diethylhydroxylamine | 5 g | 7 g |
| Potassium chloride | 2 g | 1.1 g |
| N-ethyl-N-(β-methanesulfonamidoethyl-3-methyl-4-aminoaniline sulfate | 5 g | 7.4 g |
| Sodium tetrapolyphosphate | 2 g | 2.8 g |
| Potassium carbonate | 30 g | 30 g |
| Potassium sulfite | 0.2 g | 0.3 g |
| Brightening agent 4,4'-diaminostylbenedisulfonic acid derivative | 1 g | 1.2 g |

Water was added to make a total quantity of 1 l, and pH was adjusted to 10.2.

| Bleach-fixer (tank solution and replenisher) | |
|---|---|
| Water | 800 ml |
| Iron (II) ammonium ethylenediaminetetraacetate | 60 g |
| Ethylenediaminetetraacetic acid | 3 g |
| Ammonium thiosulfate (70% aqueous solution) | 100 ml |
| Ammonium sulfite (40% aqueous solution) | 27.5 ml |

Water was added to make a total quantity of 1 l, and potassium carbonate or glacial acetic acid was added to obtain a pH of 5.7.

| Stabilizer (tank solution and replenisher) | |
|---|---|
| Water | 800 ml |
| 5-chloro-2-methyl-4-isothiazolin-3-one | 1 g |
| 1-hydroxyethylidene-1,1-diphosphonic acid | 2 g |

Water was added to make a total quantity of 1l, and sulfuric acid or potassium hydroxide was added to obtain a pH of 7.0.

Light fastness and sensitivity were evaluated in the same manner as in Example 1. Figures for sensitivity are expressed as percent sensitivity relative to the sensitivity of each sample at initiation of continuous processing. The results are shown in Tables 6 and 7.

TABLE 6

| Sample No. | Dye image stabilizer | Oxidation potential (mV) | Yellow coupler | Relative Sensitivity | Residual rate (%) |
|---|---|---|---|---|---|
| 201 (comparative) | Not added | | Example coupler Y-51 | 89 | 53 |
| 202 (comparative) | Comparative compound YST-1 | 2060 | Example coupler Y-51 | 84 | 72 |
| 203 (comparative) | Comparative compound YST-2 | 1400 | Example coupler Y-51 | 90 | 62 |
| 204 (inventive) | Example compound I-1 | 1420 | Example coupler Y-51 | 88 | 75 |
| 205 (inventive) | Example Compound I-6 | 1540 | Example coupler Y-51 | 89 | 78 |
| 206 (inventive) | Example Compound I-8 | 1510 | Example coupler Y-51 | 90 | 76 |
| 207 (inventive) | Example Compound I-17 | 1590 | Example coupler Y-51 | 85 | 77 |
| 208 (inventive) | Example compound I-21 | 1200 | Example coupler Y-51 | 88 | 78 |
| 209 (inventive) | Example compound I-22 | 1600 | Example coupler Y-51 | 85 | 78 |
| 210 (inventive) | Example Compound I-25 | 1580 | Example coupler Y-51 | 90 | 78 |
| 211 (comparative) | Not added | | Example coupler Y-3 | 94 | 50 |
| 212 (comparative) | Comparative compound YST-1 | 2060 | Example coupler Y-3 | 76 | 74 |
| 213 (comparative) | Comparative compound YST-2 | 1400 | Example coupler Y-3 | 92 | 57 |
| 214 (inventive) | Example compound I-1 | 1420 | Example coupler Y-3 | 93 | 84 |
| 215 (inventive) | Example Compound I-6 | 1540 | Example coupler Y-3 | 90 | 86 |
| 216 (inventive) | Example Compound I-8 | 1510 | Example coupler Y-3 | 94 | 82 |
| 217 (inventive) | Example Compound I-17 | 1590 | Example coupler Y-3 | 92 | 88 |
| 218 (inventive) | Example compound I-21 | 1200 | Example coupler Y-3 | 85 | 78 |
| 219 (inventive) | Example compound I-22 | 1600 | Example coupler Y-3 | 88 | 76 |
| 220 (inventive) | Example Compound I-25 | 1580 | Example coupler Y-3 | 90 | 81 |
| 221 (comparative) | Comparative | 2060 | Example coupler | 78 | 82 |

TABLE 6-continued

| Sample No. | Dye image stabilizer | Oxidation potential (mV) | Yellow coupler | Relative Sensitivity | Residual rate (%) |
|---|---|---|---|---|---|
| | compound YST-1 | | Y-20 | | |

TABLE 7

| Sample No. | Dye image stabilizer | Oxidation potential (mV) | Yellow coupler | Relative sensitivity | Residual rate (%) |
|---|---|---|---|---|---|
| 222 (inventive) | Example compound I-1 | 1420 | Example coupler Y-20 | 94 | 87 |
| 223 (inventive) | Example compound I-6 | 1540 | Example coupler Y-20 | 92 | 86 |
| 224 (inventive) | Example compound I-8 | 1510 | Example coupler Y-20 | 94 | 84 |
| 225 (comparative) | Comparative compound YST-1 | 2060 | Example coupler Y-36 | 76 | 81 |
| 226 (inventive) | Example compound I-1 | 1420 | Example coupler Y-36 | 93 | 86 |
| 227 (inventive) | Example compound I-6 | 1540 | Example coupler Y-36 | 92 | 87 |
| 228 (inventive) | Example compound I-8 | 1510 | Example coupler Y-36 | 94 | 84 |
| 229 (comparative) | Comparative compound YST-1 | 2060 | Example coupler Y-46 | 78 | 82 |
| 230 (inventive) | Example compound I-1 | 1420 | Example coupler Y-46 | 94 | 85 |
| 231 (inventive) | Example compound I-6 | 1540 | Example coupler Y-46 | 94 | 85 |
| 232 (inventive) | Example compound I-8 | 1510 | Example coupler Y-46 | 92 | 86 |

As is evident from Tables 6 and 7, the silver halide photographic light-sensitive material of the present invention undergoes little change in the sensitivity thereof between initiation and completion of continuous processing and has excellent light fastness.

EXAMPLE 3

Sample No. 301 was prepared in the same manner as with sample No. 102 of Example 1 except that layer 5 (red-sensitive layer) was replaced as described in Table 8 below.

Fifth Layer Coating Solution 10.7 g of a cyan coupler (comparative coupler C-1), 0.33 g of an antistaining agent HQ-1, 6.7 g of a high boiling organic solvent DOP and 6.7 g of HBS-1 were dissolved in 60 ml of ethyl acetate. This solution was emulsified and dispersed in 215 ml of a 10% aqueous solution of gelatin containing 10 ml of 10% sodium triisopropylnaphthalenesulfonate SU-1 using a homogenizer to yield a cyan coupler dispersion.

This dispersion was mixed with a red-sensitive silver chlorobromide emulsion Em-3 (containing 7.0 g of silver) and a gelatin solution for coating to yield a fifth layer coating solution.

TABLE 8

| | | |
|---|---|---|
| Layer 5 (red-sensitive layer) | Gelatin | 1.30 |
| | Red-sensitive silver chlorobromide emulsion (Em-3) | 0.21 |
| | Cyan coupler (C-1) | 0.32 |
| | Antistaining agent (HQ-1) | 0.01 |
| | HBS-1 | 0.20 |
| | DOP | 0.20 |

Next, sample Nos. 302 through 315 were prepared in the same manner as above except that the cyan coupler C-1 for layer 5 was replaced as shown in Tables 9 and 10 and 0.1 mmol/m$^2$ of each of the dye image stabilizers shown in Tables 9 and 10 was added to layer 5. The resulting samples were each subjected to red light exposure through an optical wedge using the sensitometer KS-7 (produced by Konica Corporation) and processed in accordance with the procedures described in Example 2, after which they were evaluated in the same manner as in Example 1. Figures for sensitivity are expressed as percent sensitivity relative to the sensitivity of sample No. 301. The results are shown in Tables 9 and 10.

TABLE 9

| Sample No. | Dye image stabilizer | Oxidation potential (mV) | Cyan coupler | Relative sensitivity | Residual rate (%) |
|---|---|---|---|---|---|
| 301 (comparative) | Not added | | Example coupler C-1 | 100 | 72 |
| 302 (comparative) | Comparative compound YST-1 | 2060 | Example coupler C-1 | 82 | 80 |
| 303 (comparative) | Comparative compound YST-2 | 1400 | Example coupler C-1 | 90 | 75 |
| 304 (inventive) | Example compound I-1 | 1420 | Example coupler C-1 | 96 | 90 |
| 305 (inventive) | Example compound I-6 | 1540 | Example coupler C-1 | 101 | 83 |
| 306 (inventive) | Example compound I-8 | 1510 | Example coupler C-1 | 102 | 83 |

TABLE 9-continued

| Sample No. | Dye image stabilizer | Oxidation potential (mV) | Cyan coupler | Relative sensitivity | Residual rate (%) |
|---|---|---|---|---|---|
| 307 (inventive) | Example compound I-17 | 1590 | Example coupler C-1 | 94 | 85 |
| 308 (inventive) | Example compound I-21 | 1200 | Example coupler C-1 | 95 | 83 |
| 309 (inventive) | Example compound I-22 | 1600 | Example coupler C-1 | 93 | 84 |
| 310 (inventive) | Example compound I-25 | 1580 | Example coupler C-1 | 92 | 80 |
| 311 (comparative) | Not added | | Example coupler C-4 | 98 | 74 |
| 312 (comparative) | Comparative compound YST-1 | 2060 | Example coupler C-4 | 81 | 82 |
| 313 (comparative) | Comparative compound YST-2 | 1400 | Example coupler C-4 | 88 | 75 |
| 314 (inventive) | Example compound I-1 | 1420 | Example coupler C-4 | 87 | 90 |
| 315 (inventive) | Example compound I-6 | 1540 | Example coupler C-4 | 99 | 92 |
| 316 (inventive) | Example compound I-8 | 1510 | Example coupler C-4 | 101 | 92 |
| 317 (inventive) | Example compound I-17 | 1590 | Example coupler C-4 | 90 | 90 |
| 318 (inventive) | Example compound I-21 | 1200 | Example coupler C-4 | 91 | 90 |
| 319 (inventive) | Example compound I-22 | 1600 | Example coupler C-4 | 92 | 88 |
| 320 (inventive) | Example compound I-25 | 1580 | Example coupler C-4 | 93 | 89 |
| 321 (comparative) | Not added | | Example coupler PC-1 | 94 | 42 |

TABLE 10

| Sample No. | Dye image stabilizer | Oxidation potential (mV) | Cyan coupler | Relative sensitivity | Residual rate (%) |
|---|---|---|---|---|---|
| 322 (comparative) | Comparative compound YST-1 | 2060 | Example coupler PC-1 | 75 | 60 |
| 323 (comparative) | Comparative compound YST-2 | 1400 | Example coupler PC-1 | 90 | 45 |
| 324 (inventive) | Example compound I-1 | 1420 | Example coupler PC-1 | 91 | 84 |
| 325 (inventive) | Example compound I-6 | 1540 | Example coupler PC-1 | 98 | 86 |
| 326 (inventive) | Example compound I-8 | 1510 | Example coupler PC-1 | 99 | 82 |
| 327 (comparative) | Not added | | Example coupler CA-1 | 102 | 74 |
| 328 (comparative) | Comparative compound YST-1 | 2060 | Example coupler CA-1 | 85 | 82 |
| 329 (comparative) | Comparative compound YST-2 | 1400 | Example coupler CA-1 | 100 | 75 |
| 330 (inventive) | Example compound I-1 | 1420 | Example coupler CA-1 | 98 | 93 |
| 331 (inventive) | Example compound I-6 | 1540 | Example coupler CA-1 | 103 | 85 |
| 332 (inventive) | Example compound I-8 | 1510 | Example coupler CA-1 | 103 | 85 |

As is evident from Tables 9 and 10, the samples incorporating comparative compound YST-1 as a dye image stabilizer, which has an ester group in the molecular structure thereof and an oxidation potential of 2060 mV (sample Nos. 302, 312, 322 and 328), had reduced sensitivity, irrespective of which cyan coupler was used. Also, the samples incorporating comparative compound YST-2 as a dye image stabilizer, which had no ester group in the molecular structure thereof but had an oxidation potential of 1400 mV, falling in the range of the present invention (sample Nos. 303, 313, 323 and 329), had no sufficient light fastness, though the sensitivity did not decrease. On the other hand, the use of a compound relating to the present invention offered sufficient sensitivity and excellent light fastness.

EXAMPLE 4

Silver halide color photographic light-sensitive material sample No. 401 was prepared by coating the following layers from the support side on a polyethylene-laminated paper support (titanium oxide content 2.7 g/m$^2$).

Layer 1: A layer containing 1.2 g/m$^2$ of gelatin, 0.32 g/m$^2$ (as silver; the same applies below) of a blue-sensitive silver chlorobromide emulsion (silver chloride content 99.3 mol %) and 0.80 g/m$^2$ of a yellow coupler Y-51 dissolved in 0.3 g/m$^2$ of dioctyl phthalate (hereinafter referred to as DOP).

Layer 2: An interlayer comprising 0.7 g/m$^2$ of gelatin, 30 g/m$^2$ of an anti-irradiation dye AI-1 and 20 g/m$^2$ of another anti-irradiation dye M-2.

Layer 3: A layer containing 1.25 g/m$^2$ of gelatin, 0.20 g/m$^2$ of a green-sensitive silver chlorobromide emulsion (silver chloride content 99.5 mol %) and 0.26 g/m$^2$ of a magenta coupler M-2 dissolved in 0.30 g/m$^2$ of DOP.

Layer 4: An interlayer comprising 1.2 g/m$^2$ of gelatin.

Layer 5: A layer containing 1.4 g/m$^2$ of gelatin, 0.20 g/m$^2$ of a red-sensitive silver chlorobromide emulsion (silver chloride content 99.7 mol %) and 0.40 g/m$^2$ of a cyan coupler C-4 dissolved in 0.20 g/m$^2$ of dibutyl phthalate (hereinafter referred to as DBP).

Layer 6: An interlayer comprising 1.0 g/m$^2$ of gelatin and 0.3 g/m$^2$ of a UV absorbent UV-1 dissolved in 0.2 g/m$^2$ of DOP.

Layer 7: A layer containing 0.5 g/m$^2$ of gelatin.

As a hardener, 2,4-dichloro-6-hydroxy-s-triazine sodium was added to layers 2, 4 and 7 to 0.017 g per gram of gelatin.

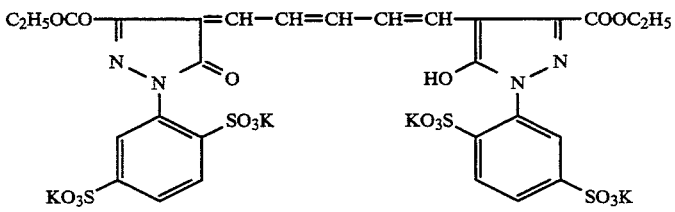

AI-1

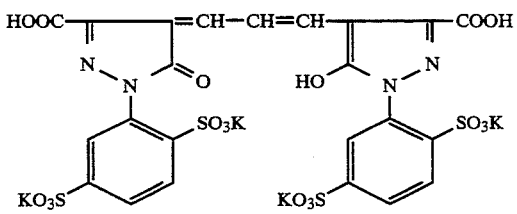

AI-2

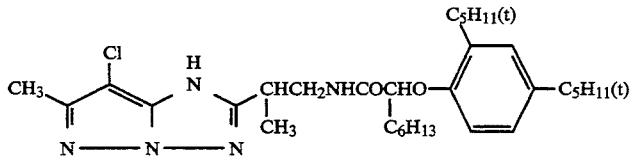

AI-3

Sample Nos. 402 through 422 were prepared in the same manner as with sample No. 401 except that yellow coupler Y-51 in layer 1 was replaced by each of the yellow couplers shown in Table 11 and each of the compounds of the present invention shown in Table 11 was added at 0.6 g/m$^2$.

For these samples, the yellow coupler was added in an amount equal to that of yellow coupler Y-51 in sample No. 401.

Samples Nos. 401 through 422 thus prepared were each subjected to blue light exposure through an optical wedge and then developed as follows.

| Developing procedures | Temperature | Time |
|---|---|---|
| Color development | 34.7 ± 0.3° C. | 45 seconds |
| Bleach-fixation | 34.7 ± 0.5° C. | 45 seconds |
| Stabilization | 30 to 34° C. | 90 seconds |
| Drying | 60 to 80° C. | 60 seconds |

The processing solutions used in the respective processes had the following compositions.

| Color developer | |
|---|---|
| Water | 800 ml |
| Triethanolamine | 8 g |
| N,N-diethylhydroxylamine | 5 g |
| Potassium chloride | 2 g |
| N-ethyl-N-(β-methanesulfonamidoethyl-3-methyl-4-aminoaniline sulfate | 5 g |
| Sodium tetrapolyphosphate | 2 g |
| Potassium carbonate | 30 g |
| Potassium sulfite | 0.2 g |

Water was added to make a total quantity of 1l, and pH was adjusted to 10.05.

| Bleach-fixer | |
|---|---|
| Iron (III) ammonium ethylenediaminetetraacetate | 60 g |
| Ethylenediaminetetraacetic acid | 3 g |
| Ammonium thiosulfate (70% aqueous solution) | 100 ml |
| Ammonium sulfite (40% aqueous solution) | 27.5 ml |

Water was added to make a total quantity of 1l, and potassium carbonate or glacial acetic acid was added to obtain a pH of 5.7.

| Stabilizer | |
|---|---|
| 5-chloro-2-methyl-4-isothiazolin-3-one | 1 g |
| 1-hydroxyethylidene-1,1-diphosphonic acid | 2 g |

Water was added to make a total quantity of 1l, and sulfuric acid or potassium hydroxide was added to obtain a pH of 7.0.

With respect to each sample after processing, the maximum density ($D_{max}$) of the blue-sensitive emulsion layer was determined. Also, light fastness was evaluated by calculating the dye image residual rate (%) at an initial density of 1.0 in a 10-day fading test using a fade-O-meter. Also, a negative film was obtained by photographing a color checker (produced by Macbeth Company) using the Konica Color GX-100 (produced by Konica Corporation) and developed. Then, after tone adjustment in the gray portion, this negative film was printed on the above sample Nos. 401 through 422 and processed in the same procedures as above, after which color reproduction for each hue was evaluated. The results are shown in Table 11.

TABLE 11

| Sample. No | Yellow coupler in layer 1 | Compound of the present invention | Maximum density | Light fastness (%) | Color reproduction*1 Red | Green | Yellow | Remark |
|---|---|---|---|---|---|---|---|---|
| 401 | Y-51 | — | 2.62 | 72 | B | C | C | Comparative |
| 402 | Y-51 | II-10 | 2.65 | 91 | B | C | C | Comparative |
| 403 | Y-2 | — | 2.41 | 53 | A | A | A | Comparative |
| 404 | Y-2 | II-10 | 2.50 | 92 | A | A | A | Inventive |
| 405 | Y-2 | II-1 | 2.51 | 89 | A | A | A | Inventive |
| 406 | Y-2 | II-4 | 2.52 | 89 | A | A | A | Inventive |
| 407 | Y-2 | II-17 | 2.50 | 91 | A | A | A | Inventive |
| 408 | Y-2 | II-18 | 2.51 | 90 | A | A | A | Inventive |
| 409 | Y-3 | II-1 | 2.49 | 90 | A | A | A | Inventive |
| 410 | Y-3 | II-4 | 2.47 | 89 | A | A | A | Inventive |
| 411 | Y-3 | II-10 | 2.51 | 91 | A | A | A | Inventive |
| 412 | Y-3 | II-17 | 2.48 | 90 | A | A | A | Inventive |
| 413 | Y-3 | II-18 | 2.50 | 88 | A | A | A | Inventive |
| 414 | Y-36 | II-1 | 2.48 | 89 | A | A | A | Inventive |
| 415 | Y-36 | II-4 | 2.51 | 91 | A | A | A | Inventive |
| 416 | Y-36 | II-10 | 2.50 | 93 | A | A | A | Inventive |
| 417 | Y-36 | II-17 | 2.53 | 91 | A | A | A | Inventive |
| 418 | Y-36 | II-18 | 2.52 | 90 | A | A | A | Inventive |
| 419 | Y-46 | II-4 | 2.49 | 85 | A | A | A | Inventive |
| 420 | Y-46 | II-10 | 2.51 | 88 | A | A | A | Inventive |
| 421 | Y-46 | II-17 | 2.51 | 86 | A | A | A | Inventive |
| 422 | Y-46 | II-18 | 2.48 | 85 | A | A | A | Inventive |

*1: Color reproduction (hue, chromaticity) C = poor; B = slightly poor; A = good.

As is evident from Table 11, sample Nos. 401 and 402, which incorporated a yellow coupler not represented by formula Y-I, had a high maximum density but poor color reproducibility.

On the other hand, sample No. 403, which incorporated a yellow coupler represented by formula Y-I, cannot be said to be satisfactory as to maximum density and light fastness, though the color reproducibility improved. In contrast, sample Nos. 404 through 422 of the present invention all had a high maximum density, excellent light fastness and a sufficient level of color reproducibility.

What is claimed is:

1. A silver halide light-sensitive photographic material comprising a support having provided thereon, a silver halide emulsion layer containing a compound represented by Formula II, and a cyan coupler represented by Formula C-I or CII;

Formula II

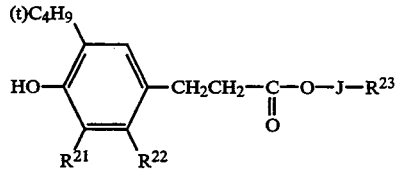

wherein $R^{21}$ and $R^{22}$ independently represent hydrogen or alkyl having 1 to 5 carbon atoms; J represents alkylene or a simple bond; $R^{23}$ represents a heterocyclic residue;

Formula C-I

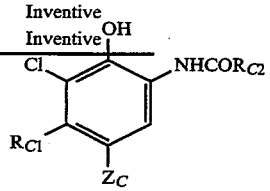

wherein $R_{C1}$ represents alkyl having 2 to 6 carbon atoms; $R_{c2}$ represents a ballast group; $Z_c$ represents hydrogen or a group capable of splitting off upon coupling with the oxidation product of a developing agent, Formula C-II

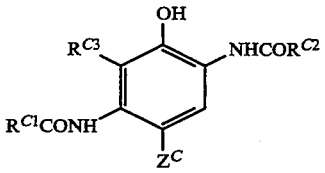

wherein $R^{c1}$ represents alkyl, cycloalkyl, aryl or a heterocyclic group; $R^{c2}$ represents a ballast group; $R^{c3}$ represents hydrogen, halogen, alkyl or alkoxy; $R^{c1}$ and $R^{c3}$ may combine to form a ring; $Z^c$ represents hydrogen or an atom or group capable of splitting off upon coupling with the oxidation product of a developing agent.

2. A silver halide light-sensitive photographic material comprising a support having provided thereon, a plurality of silver halide emulsion layers including at least a first silver halide emulsion layer containing a compound represented by Formula II, and a yellow coupler represented by Formula Y-I; and a second silver halide emulsion layer containing a cyan coupler represented by Formula C-I or C-II, and a compound of Formula II;

Formula II

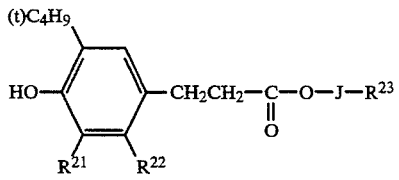

wherein $R^{21}$ and $R^{22}$ independently represent hydrogen or alkyl having 1 to 5 carbon atoms; J represents alkylene or a simple bond; $R^{23}$ represents a heterocyclic residue;

Formula Y-I

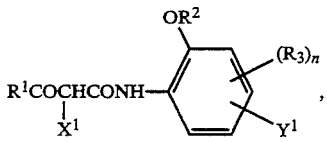

wherein $R^1$ represents alkyl or cycloalkyl; $R^2$ represents alkyl, cycloalkyl, aryl or acyl; $R^3$ represents a group capable of being a substituent on a benzene ring; n represents 0 or 1; $X^1$ represents a group capable of splitting off upon coupling with the oxidation product of a developing agent; $Y^1$ represents an organic group;

Formula C-I

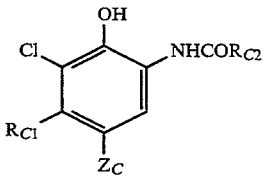

wherein $R_{c1}$ represents alkyl having 2 to 6 carbon atoms; $R_{c2}$ represents a ballast group; $Z_c$ represents hydrogen or a group capable of splitting off upon coupling with the oxidation product of a developing agent, Formula C-II

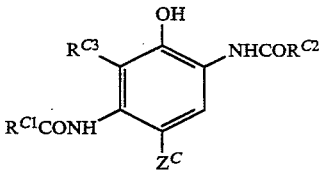

wherein $R^{c1}$ represents alkyl, cycloalkyl, aryl or a heterocyclic group; $R^{c2}$ represents a ballast group; $R^{c3}$ represents hydrogen, halogen, alkyl or alkoxy; $R^{c1}$ and $R^{c3}$ may combine to form a ring; $Z^c$ represents hydrogen or an atom or group capable of splitting off upon coupling with the oxidation product of a developing agent.

* * * * *